(12) United States Patent
Kamo et al.

(10) Patent No.: US 6,869,713 B2
(45) Date of Patent: Mar. 22, 2005

(54) FUEL CELL, FUEL CELL GENERATOR, AND EQUIPMENT USING THE SAME

(75) Inventors: Tomoichi Kamo, Tokai-mura (JP); Syuichi Oohara, Hitachi (JP); Kenji Yamaga, Hitachi (JP); Jinichi Imahashi, Hitachi (JP); Masanori Yoshikawa, Hitachinaka (JP); Norio Yamada, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/935,164

(22) Filed: Aug. 23, 2001

(65) Prior Publication Data

US 2002/0172853 A1 Nov. 21, 2002

(30) Foreign Application Priority Data

May 18, 2001 (JP) ........................................ 2001-148602

(51) Int. Cl.⁷ ............................. H01M 8/10; H01M 8/02
(52) U.S. Cl. ............................................. 429/31; 429/34
(58) Field of Search ............................. 429/30–34, 38, 429/39

(56) References Cited

U.S. PATENT DOCUMENTS

| | | | |
|---|---|---|---|
| 4,562,123 A | | 12/1985 | Shimizu et al. |
| 4,774,153 A | * | 9/1988 | Sterzel ........................ 429/12 |
| 5,244,752 A | | 9/1993 | Zymboly |
| 5,432,023 A | | 7/1995 | Yamada et al. |
| 5,458,989 A | * | 10/1995 | Dodge ........................ 429/31 |
| 5,916,514 A | | 6/1999 | Eshraghi |
| 5,928,808 A | | 7/1999 | Eshraghi |
| 5,989,300 A | | 11/1999 | Eshraghi |
| 6,007,932 A | * | 12/1999 | Steyn ........................ 429/31 |
| 6,326,097 B1 | * | 12/2001 | Hockaday .................... 429/34 |
| 6,338,913 B1 | | 1/2002 | Eshraghi |
| 6,399,232 B1 | | 6/2002 | Eshraghi |
| 6,403,248 B1 | | 6/2002 | Eshraghi |
| 6,403,517 B1 | | 6/2002 | Eshraghi |
| 6,444,339 B1 | | 9/2002 | Eshraghi |
| 6,495,281 B1 | | 12/2002 | Eshraghi |
| 2002/0076597 A1 | | 6/2002 | Chang et al. |
| 2002/0182475 A1 | * | 12/2002 | Pan ............................. 429/41 |

FOREIGN PATENT DOCUMENTS

| | | |
|---|---|---|
| DE | 199 09 930 A1 | 9/2000 |
| EP | 0 270 894 A1 | 6/1988 |
| JP | 59-180979 | 10/1984 |
| JP | 09-223507 | 8/1997 |
| JP | 9-223507 | 8/1997 |
| JP | P2000-26835 A | 9/2000 |
| JP | 2000-268835 | 9/2000 |
| JP | 2000-268836 | 9/2000 |
| JP | 2001006708 | 1/2001 |
| WO | WO-99/60642 A * | 11/1999 |

OTHER PUBLICATIONS

JPO Machine Translation for JP–2000–268836 A (Sep. 2000).*

S.R. Narayanan et al., "Development of a Miniature Fuel Cell for Portable Applications," *Electrochemical Society Proceedings*, vol. 2001–4, pp. 254–264, Spring 2001., no month.

* cited by examiner

*Primary Examiner*—Susy Tsang-Foster
(74) *Attorney, Agent, or Firm*—Antonelli, Terry, Stout & Kraus, LLP

(57) ABSTRACT

To provide a compact power source best suited for portable use, which uses no separator and has no auxiliary equipment such as a fluid supply mechanism, and portable electronic equipment using the power source. A fuel cell, a fuel cell generator, and electric equipment using these have a construction such that the fuel cell, having an anode for oxidizing liquid fuel, a cathode for reducing oxygen, and an electrolyte membrane for insulating the anode from the cathode, has a construction of a hollow support, the anode, electrolyte membrane, and cathode are disposed on the outer peripheral surface of the hollow support to form a generator section, and the fuel is brought into contact with the inside of the hollow support and gas containing the oxygen is brought into contact with the outside of the generator section.

22 Claims, 24 Drawing Sheets

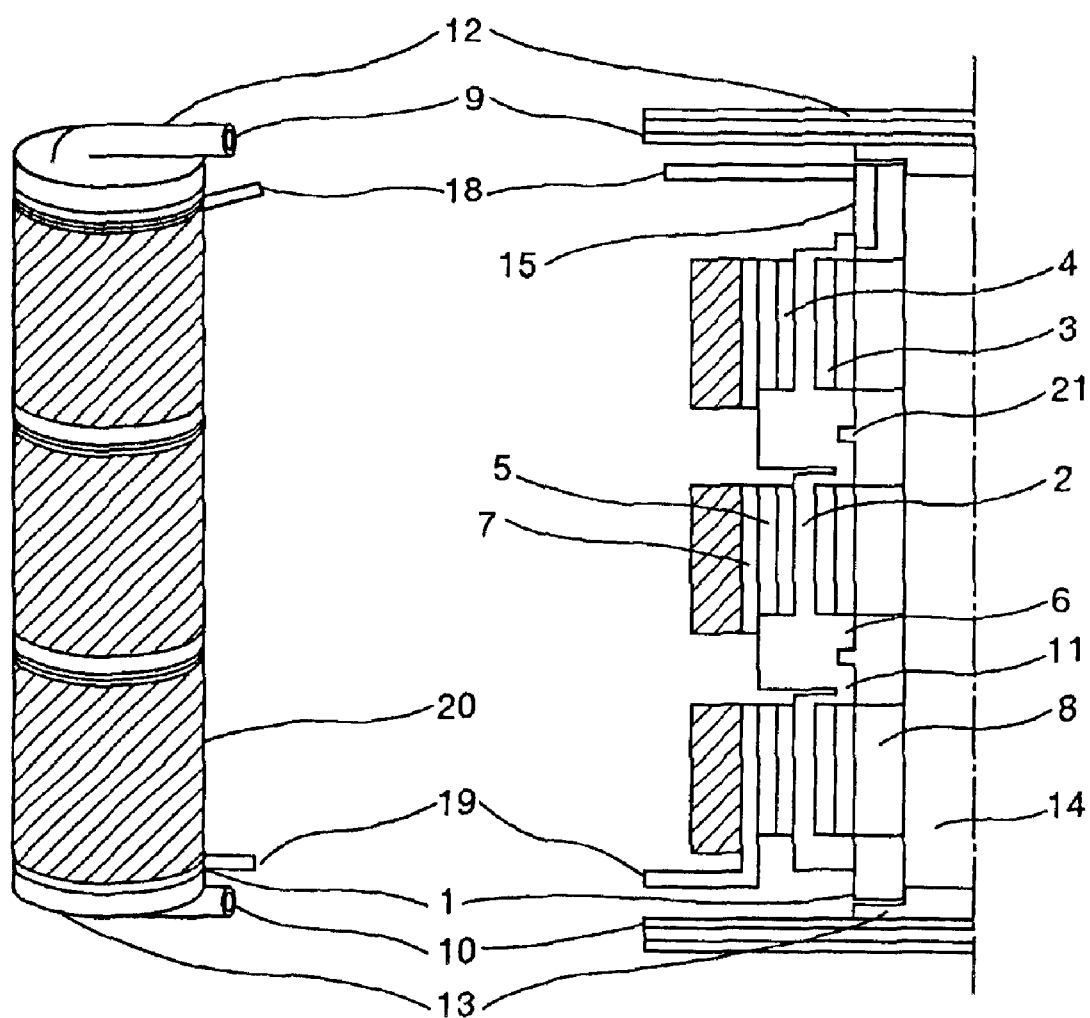

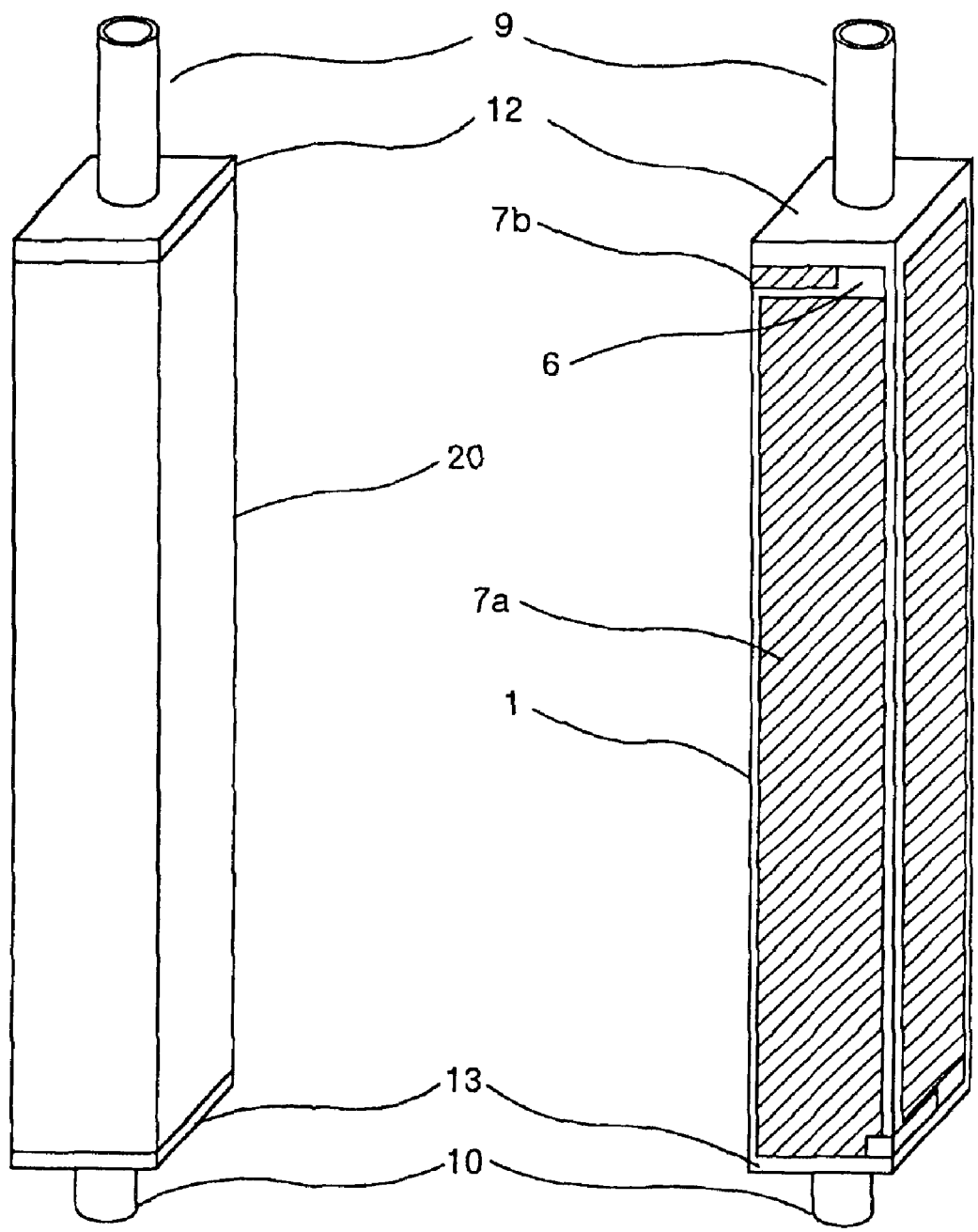

FIG.24A
FIG.24B
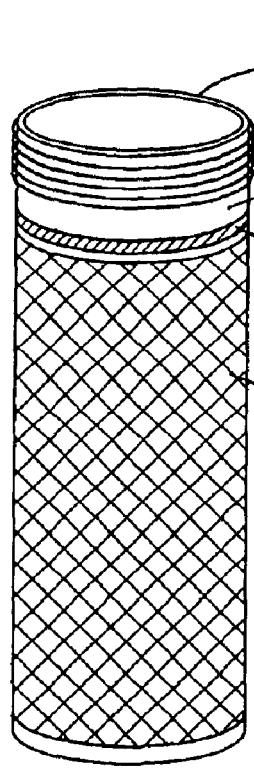
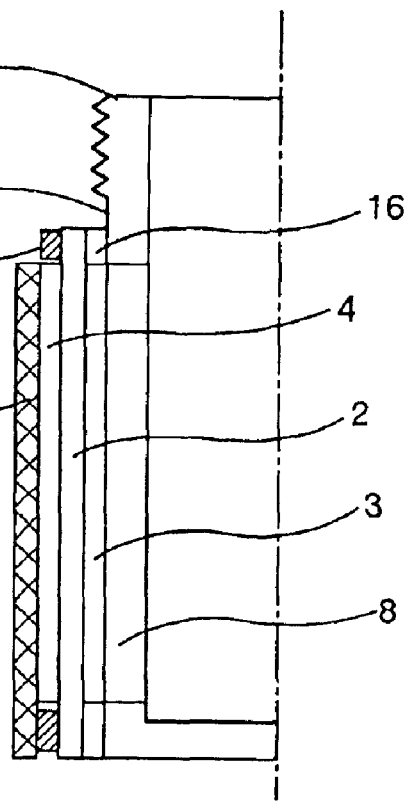

FIG.25A
FIG.25B
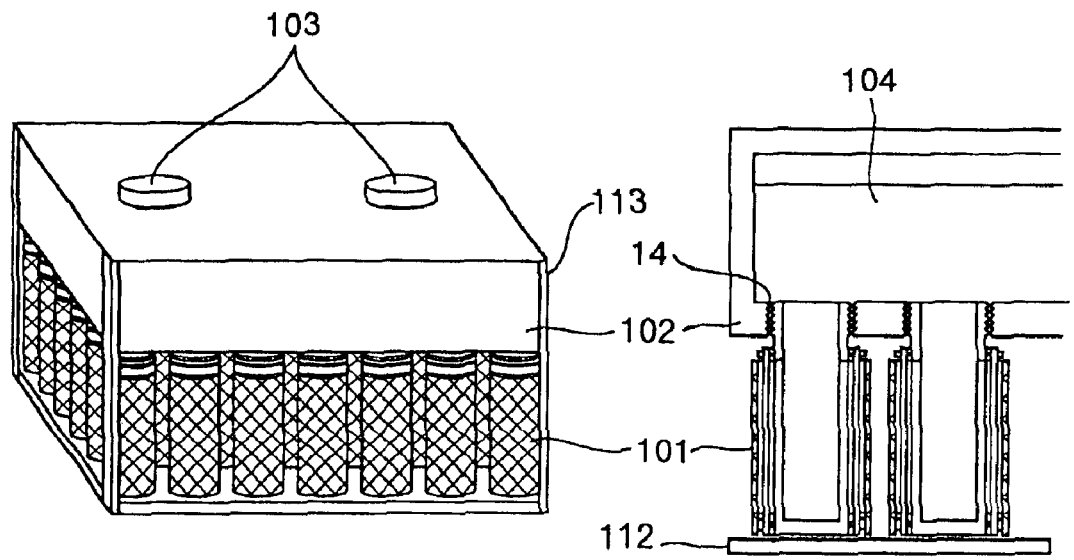
FIG.26A
FIG.26B
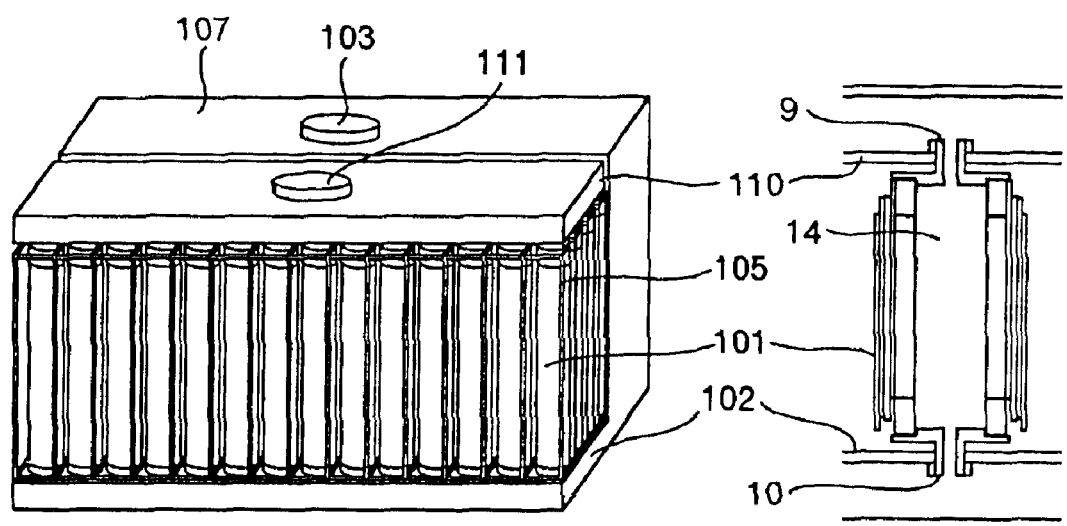

FUEL CELL, FUEL CELL GENERATOR, AND EQUIPMENT USING THE SAME

BACKGROUND OF THE INVENTION

The present invention relates to a fuel cell that is formed of an anode, electrolyte membrane, cathode, and diffusion layer and is configured so that fuel is oxidized on the anode and oxygen is reduced on the cathode. Also, it relates to a generator incorporating such a fuel cell, a small-size portable power source, and electric or electronic equipment using such a power source.

With advances in electronic technology, electric and electronic equipment such as telephone sets, book type personal computers, audio and visual equipment, and mobile information terminals and small-sized portable electronic equipment have come into wide use rapidly.

Conventionally, such portable electronic equipment has been a system driven by a primary battery or a secondary battery. The secondary battery has developed with emergence of new type secondary batteries, decreased size and weight of battery, and the high energy density technology. The new type secondary batteries have developed from sealed lead batteries to nickel-cadmium batteries, nickel-hydrogen batteries and further to lithium-ion batteries. However, the secondary battery must be charged after a fixed amount of electric power has been consumed, so that a charging facility and charging time are needed. Therefore, there remain many problems in driving the portable electronic equipment continuously for a long period of time. In the future, the portable electronic equipment will tend to necessitate a power source with a high energy density, that is, a power source capable of withstanding long-term continued use in response to increased information amount and increased speed. Therefore, a need for a small generator (micro-generator) that need not be charged is increasing.

To fulfill this need, a fuel cell power source has been proposed. The fuel cell converts chemical energy of fuel directly into electrical energy in an electrochemical manner. It does not necessitate a power section using an internal combustion engine such as an ordinary engine generator, and has a possibility of being used as a small power generating device. Also, the fuel cell can continue power generation merely by replenishing fuel, so that it can eliminate the need for stopping driving of portable electronic equipment in use for the purpose of charging unlike the conventional secondary battery.

Among these fuel cells, a polymer electrolyte fuel cell (PEFC), in which by using an electrolyte membrane of perfluorocarbon sulfonic acid, hydrogen gas is oxidized on the anode and oxygen is reduced on the cathode to generate power, is known as a cell with a high output density.

To make the fuel cell of this type smaller in size, as disclosed in, for example, JP-A-9-223507 specification, a small PEFC generator has been proposed in which an assembly of cylindrical cells provided with anode and cathode electrodes on the inside and outside surfaces of a hollow fiber shaped electrolyte is formed, and hydrogen gas and air are supplied to the inside and outside of the cylinder, respectively.

In the case were this fuel cell is used as a power source for portable electronic equipment, however, the volumetric energy density is low because the fuel is hydrogen gas, so that the capacity of a fuel tank must be increased.

Also, this system requires auxiliary equipment such as equipment for feeding fuel gas and oxidizer gas (air etc.) into the generator and equipment for humidifying the electrolyte membrane to maintain the cell performance, so that the generating system has a complex construction, and cannot be made small in size sufficiently.

In order to increase the volumetric energy density of fuel, it is effective to use liquid fuel and to make the construction simple by eliminating the auxiliary equipment for supplying fuel and oxidizer to the cell. For this purpose, some proposals have been made. As a recent example, a direct methanol fuel cell (DMFC), in which methanol and water are used as fuel, as disclosed in JP-A-2000-268835 specification and JP-A-2000-268836 specification has been proposed.

This generator is configured so that a material for supplying liquid fuel by the capillary force is provided on the outside wall side of a liquid fuel tank, an anode is disposed so as to be in contact with the material, and further a polymer electrolyte membrane and a cathode are bonded successively. Oxygen is supplied by the diffusion of oxygen to the cathode outside surface touching the outside air. According to this system, therefore, the generator has a simple configuration that does not require the auxiliary equipment for supplying fuel and oxidizer gas.

However, since the output voltage of DMFC at the load time is 0.3 to 0.4 V per unit cell, it is necessary to mount fuel tanks attached to the fuel cells, the number of the fuel cells corresponding to the voltage required by portable electronic equipment etc., and to connect the cells to each other in series. Therefore, there arises a problem in that to make the size of generator small, the capacity of fuel tank decreases with increasing number of cells connected in series, so that the number of fuel tanks is distributed according to the number of cells connected in series.

SUMMARY OF THE INVENTION

An object of the present invention is to provide a fuel cell generator capable of easily continuing power generation by the replenishment of fuel without any need for charging each time a fixed amount of electric power is consumed along with the use of electric power unlike the secondary battery, which is a system using a fuel with a high volumetric energy density.

Another object of the present invention is to provide a small-size power source suited for portable use, which has no need for using auxiliary equipment such as a fluid supply mechanism for forcedly causing fuel and oxidizer gas to flow, and portable electronic equipment using the power source.

To attain the above objects, the present invention is characterized by a fuel cell having an anode for oxidizing liquid fuel, a cathode for reducing oxygen, and an electrolyte membrane for insulating the anode from the cathode, wherein the fuel cell has a construction of a hollow support, the anode, electrolyte membrane, and cathode are disposed on the outer peripheral surface of the hollow support to form a generator section, and the fuel is brought into contact with the inside of the hollow support and gas containing the oxygen is brought into contact with the outside of the generator section.

Also, the present invention is characterized by a fuel cell generator characterized in that a fuel cell, having an anode for oxidizing liquid fuel, a cathode for reducing oxygen, and an electrolyte membrane for insulating the anode from the cathode, has a construction of a hollow support; the fuel cell generator includes a fuel cell unit in which a plurality of fuel cells each having a generator section formed by the anode, electrolyte membrane, and cathode disposed on the outer peripheral surface of the hollow support are connected and a vessel for storing the liquid fuel, the generator sections being connected electrically to each other; and power is generated by supplying the liquid fluid from the vessel into the hollow support.

The small fuel cell generator in accordance with the present invention is characterized in that in the fuel cell that uses liquid fuel and is configured so that the anode for oxidizing fuel and the cathode for reducing oxygen are disposed via the electrolyte membrane, the fuel cell units each having a generator section formed by the anode, electrolyte membrane, and cathode disposed on the outer peripheral surface of the hollow support are connected with the vessel for storing the liquid fuel being used as a platform, the fuel cell units being connected electrically to each other in series or in parallel.

Especially, in the case where the required current is relatively small and a high voltage is needed, the fuel cell unit is provided with a plurality of generator sections in which the anode, electrolyte membrane, and cathode are disposed on the outer peripheral surface of the hollow support, and the generator sections are connected to each other in series with a conductive interconnector, by which a high voltage can be achieved.

Fuel is supplied without any use of a forced supply mechanism provided in the hollow support by connecting the fuel tank as a platform. At this time, the hollow support is filled with a material for holding liquid fuel and sucking it up by the capillary force, by which fuel replenishment is more stabilized. On the other hand, the fuel cell unit having the generator section on the outer peripheral surface of the hollow support is supplied with an oxidizer by the diffusion of oxygen in air. By using aqueous solution of methanol with a high volumetric energy density as the liquid fuel, power generation can be continued for a long period of time as compared with the case where hydrogen gas in the tank having the same capacity is used as a fuel.

By using the power source in accordance with the present invention as a battery charger attached to charge a cellular phone, portable personal computer, portable audio and visual equipment, and other portable information terminals, which are mounted with a secondary battery, during the time when they are not in use, or by using the power source as a directly incorporated power source without any secondary battery being mounted, the electronic equipment can be used for a long period of time, and continuous use of the electronic equipment can be achieved by the replenishment of fuel.

BRIEF DESCRIPTION OF DRAWINGS

FIG. 8A is an outside construction view of a high-voltage cylindrical fuel cell unit in accordance with the present invention, and FIG. 8B is a sectional configuration view thereof;

FIG. 9A is an outside construction view of a high-voltage square tubular fuel cell unit in accordance with the present invention, and FIG. 9B is a sectional configuration view thereof;

FIG. 24A is an outside construction view of a cylindrical fuel cell unit in accordance with the present invention, and FIG. 24B is a sectional configuration view thereof;

FIG. 25A is an outside construction view of a power source formed of high-voltage cylindrical fuel cell units, and FIG. 25B is a sectional view showing a state in which a fuel tank is connected to the fuel cell unit in accordance with the present invention;

FIG. 26A is an outside construction view of a power source formed of cylindrical fuel cell units, and FIG. 26B is a sectional view showing a state in which a fuel tank is connected to the fuel cell unit in accordance with the present invention.

DETAILED DESCRIPTION OF THE INVENTION

Embodiments of the present invention will now be described in detail with reference to the accompanying drawings.

Figures 1A, 1B:
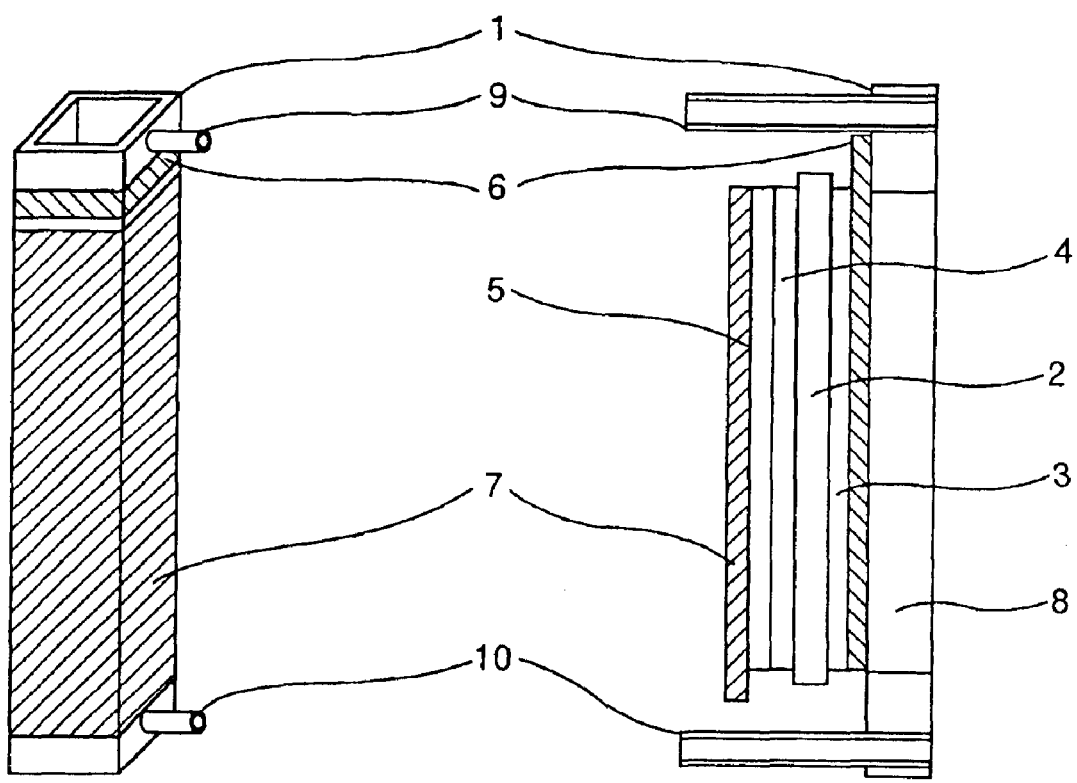
FIG. 1A is an outside construction view of a fuel cell unit in accordance with the present invention.
FIG. 1B is a sectional configuration view thereof.

A construction of a fuel cell unit constituting one embodiment of the present invention is schematically shown in FIG. 1A, and one sectional construction of a wall of the fuel cell unit is shown in FIG. 1B.

An anode collector 6 is put around a hollow square tubular support 1, and an anode electrode 3, an electrolyte 2, a cathode electrode 4, a diffusion layer 5, and a cathode collector 7 are laminated successively and bonded to form a generator section. This is called a fuel cell, a fuel cell unit, or a unit cell. As described later, a plurality of fuel cell units combined with each other are called a fuel cell module or a modular cell.

Figures 2A, 2B:
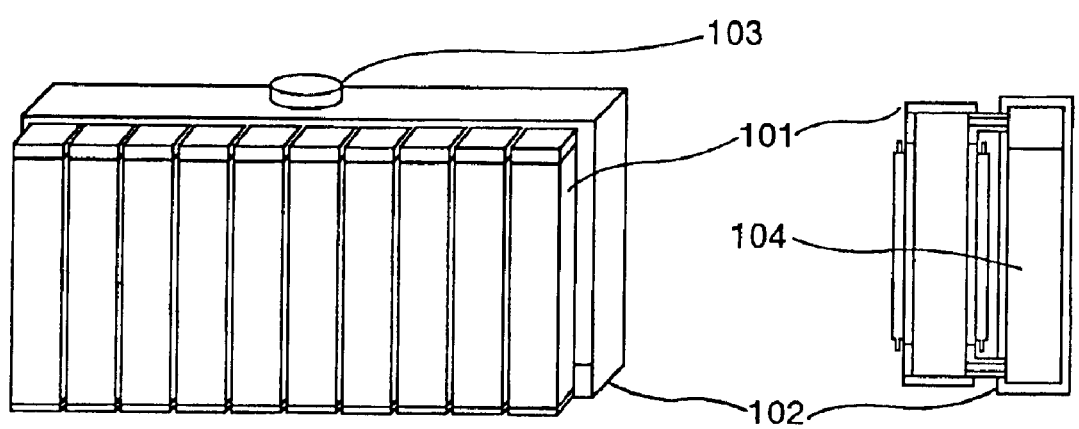
FIG. 2A is an outside construction view of a fuel cell power source in accordance with the present invention.
FIG. 2B is a sectional configuration view thereof.

At this time, a wall surface of the hollow support 1 covered with the anode collector to which the anode is bonded has a wall surface construction of a penetrating net shape or a penetrating porous shape so that liquid fuel supplied in the tube comes into contact with the anode. A construction of a power source in which a fuel supply port 9 and a fuel discharge port 10 are connected to a fuel tank 102 with a fuel cell module 101 constituted by a plurality of fuel cell units being a platform is shown in FIG. 2A, and a state in which the fuel tank is connected to the fuel cell unit is shown in FIG. 2B.

The fuel tank 102 is provided with a fuel resupply port 103 on the top thereof, and aqueous solution of methanol is contained therein as a fuel 104. By this configuration, fuel is supplied without the use of a forced supply mechanism in the hollow support. At this time, the fuel replenishment can be stabilized more by filling a liquid holding material 14, which is a material for holding liquid fuel in the hollow support and sucking it up by the capillary force.

On the other hand, as shown in FIG. 1B, the cathode electrode 4 has a construction such that oxygen in the atmosphere is supplied by diffusion through the porous cathode collector 7 and the diffusion layer 5, so that the cathode electrode 4 is supplied with oxygen without the use of a forced supply mechanism for oxidizer gas.

In the fuel cell using aqueous solution of methanol as a fuel, electric power is generated by converting chemical energy of methanol directly into electrical energy by the electrochemical reaction shown below. On the anode electrode side, the supplied aqueous solution of methanol reacts according to Formula (1) to be dissociated into carbon dioxide, hydrogen ions, and electrons.

$$CH_3OH + H_2O \rightarrow CO_2 + 6H^+ + 6e^- \tag{1}$$

The yielded hydrogen ions move in the electrolyte membrane from the anode to the cathode side, and react, on the cathode electrode, with oxygen gas diffused from air and electrons on the cathode electrode according to Formula (2) to yield water.

$$6H^+ + 3/2O_2 + 6e^- \rightarrow 3H_2O \tag{2}$$

Therefore, the total chemical reaction causing power generation is such that as shown in Formula (3), in which methanol is oxidized by oxygen to yield carbon dioxide and water, and the chemical formula is the same as that for flame combustion of methanol.

$$CH_3OH + 3/2O_2 \rightarrow CO_2 + 3H_2O \tag{3}$$

The open-circuit voltage of unit cell is approximately 1.2 V, and is substantially 0.85 to 1.0 V due to the influence of fuel permeating the electrolyte membrane. Although the practical voltage in load operation is not subject to any special restriction, a voltage region of about 0.3 to 0.6 is selected. Therefore, when the fuel cells are used actually as a power source, the unit cells are used by being connected in series so that a predetermined voltage can be obtained according to the requirements of load equipment. Although the output current density of unit cell is varied by the electrode catalyst, electrode construction, and other factors, design is made so that the power generation area of unit cell is efficaciously selected so that a predetermined current can be obtained. Also, the cell capacity can be regulated appropriately by connecting unit cells in parallel.

The support constituting the fuel cell unit is characterized by a tubular construction, which is one of the hollow support constructions. The cross sectional shape of the support may be square, circle, or others. It is not subject to any special restriction as long as it can take a sufficient power generation area in a compact manner.

However, in order to mount the fuel cell unit in a specified volume in a compact manner, the cylindrical shape and the square tubular shape have a high filling efficiency, and are preferable in terms of workability for mounting the fuel cell generator section.

The material for the support may be a material that is electrochemically inert and has a sufficient strength with a thin shape having durability in a service environment. There can be cited, for example, polyethylene, polypropylene, polyethylene terephthalate, vinyl chloride, polyacrylic resins and other engineering resins, an electrical insulating material in which these materials are reinforced by a filler etc., a carbon material having high corrosion resistance in the yielded water generating atmosphere, stainless steels, and an electroconductive material in which the surface of ordinary iron, nickel, copper, aluminum, or an alloy of these metals is subjected to corrosion resisting treatment.

Also, it is effective to use an insulating material in which a base metal having poor corrosion resistance is coated with the aforementioned resin. Anyway, the material is not subject to any special restriction as long as it has strength for supporting its shape and corrosion resistance and is electrochemically inert.

The interior of the tubular support is used as a space for conveying fuel. A sucking-up material that is filled in the tubular support to stabilize the supply of fuel may be any material that has a small contact angle with aqueous solution of methanol and is electrochemically inert and corrosion resistant. As the sucking-up material, powdery or fiber-like material may be used. For example, glass, alumina, silica alumina, silica, non-graphite carbon, fiber such as cellulose, and water absorbing polymeric fiber are desirable materials because of low filling density and high properties for holding aqueous solution of methanol.

A material in which fine particles of platinum and ruthenium or platinum-ruthenium alloy are dispersedly carried on a carbon powder carrier and a material in which fine particles of platinum are dispersedly carried on a carbon carrier can be easily manufactured and used as an anode catalyst forming the generator section and a cathode catalyst, respectively.

The anode and cathode catalysts for the fuel cell in accordance with the present invention are not subject to any special restriction as long as they are the catalysts used for the ordinary direct methanol fuel cell. As the electrolyte membrane, a membrane exhibiting hydrogen ion conductivity is used. As the membrane material, a sulfonated fluorine polymer represented by polyperfluorostyrene sulfonic acid and perfluorocarbon sulfonic acid, and a material in which a hydrocarbon polymer such as polystyrene sulfonic acid, sulfonated polyether sulfones, and sulfonated polyether ether ketons is sulfonated can be used. If these materials are used as the electrolyte membrane, the fuel cell can generally be operated at a temperature of 80° C. or lower.

Also, by the use of a composite electrolyte membrane in which a hydrogen ion conductive inorganic material such as tungsten oxide hydrate, zirconium oxide hydrate, and tin oxide hydrate is dispersed microscopically in a heat-resistant resin, the fuel cell can be operated in a higher temperature region. Anyway, if an electrolyte membrane having high hydrogen ion conductivity and low methanol permeability is used, the power generation utilization factor of fuel increases, so that a smaller size of generator and long-term power generation, which are the effects of the present invention, can be achieved at a higher level.

The generator section forming the fuel cell unit can be manufactured, for example, by the method described below. Specifically, the fuel cell unit is manufactured in five steps: 1) a step of applying a conductive collector around the hollow support and making the wall surface of anode joint portion porous by means of through holes, 2) a step of forming an electrode by applying a paste-like substance to a porous portion of the hollow support to a fixed thickness of 10 to 50 $\mu$m, the paste-like substance being obtained by adding and dispersing a solution in which the same substance as the anode catalyst and the electrolyte membrane are dissolved in advance in a volatile organic solvent as a binder, 3) a step of applying an electrolyte solution dissolved in the volatile organic solvent in advance onto the anode electrode so that the thickness after membrane formation is 20 to 50 $\mu$m, 4) a step of forming the electrode by applying a paste-like substance onto the electrolyte membrane to a fixed thickness of 10 to 50 $\mu$m, the paste-like substance being obtained by kneading a solution in which the same substance as the cathode catalyst and the electrolyte membrane are dissolved in advance in a volatile organic solvent as a binder, and 5) a step of forming the diffuison layer by applying a paste-like substance onto the surface of the cathode electrode, the paste-like substance being obtained by mixing carbon powders with a predetermined amount of water repellent dispersant, for example, aqueous dispersion of fine particles of polytetrafluoroethylene.

At this time, it is important that in step 3), the electrolyte membrane portion be made larger in area than the cathode area, and the electrolyte membrane be brought into close contact with the support or be bonded to the support using an adhesive to provide a seal. The cathode portion of the obtained fuel cell unit is mounted with a conductive porous material or net, which is used as a cathode collector to take out a terminal, and a terminal is also taken out from the anode collector.

When the fuel cell unit is formed of a single fuel cell, step 1) is unnecessary, and an anode terminal can be taken out directly by using the conductive hollow support. Also, when the water repellent aqueous dispersion contains a surface active agent serving as a catalytic poison component of platinum catalyst or platinum-ruthenium alloy catalyst, a method is effective in which a paste-like substance is applied onto one surface of a conductive woven fabric such as carbon fiber, the paste-like substance being obtained by mixing carbon powders with a predetermined amount of water repellent dispersant, for example, aqueous dispersion of polytetrafluoroethylene fine particles, and is fired at a temperature at which the surface active agent decomposes, and then the coated surface is mounted so as to be in contact with the cathode to use the carbon fiber woven fabric as a cathode terminal.

Besides, a method in which a membrane electrode assembly is formed by applying the anode of a given thickness onto the inside surface of the cylindrical electrolyte membrane and applying the cathode and diffusion layer onto the outside surface thereof, and the membrane electrode assembly is mounted on the tubular support, and a method in which the anode, electrolyte membrane, cathode, and water repellent layer are individually formed into a cylindrical shape in advance, or some of these elements are combined and bonded into a cylindrical shape, and these elements are mounted on the support successively are also effective.

Furthermore, a method in which a membrane electrode assembly obtained by applying the diffusion layer onto the outer peripheral surface of cathode is mounted by winding the membrane electrode assembly around the tubular support and bonding the joints of the electrolyte membrane is also effective.

However, because the bonding of the anode, electrolyte membrane, and cathode is a step of forming a reaction interface of electrode, the bonding is desirably performed in advance by the operation of applying the anode and cathode to the electrolyte.

Anyway, the manufacturing method for a fuel cell unit is not subject to any special restriction as long as the method is such that the anode, electrolyte membrane, cathode, and water repellent layer are laminated on the surface of support in that order, and a sufficient reaction interface is formed between the anode and the electrolyte membrane and between the cathode and the electrolyte membrane. Also, when the cathode is formed, a predetermined amount of water repellent dispersant, for example, fine particles of polytetrafluoroethylene is added to a solution in which the same substance as the cathode catalyst and the electrolyte membrane are dissolved in advance in a volatile organic solvent to form paste, and the paste is applied, by which a cell without the need for the water repellent layer can be manufactured.

Figures 3A, 3B:
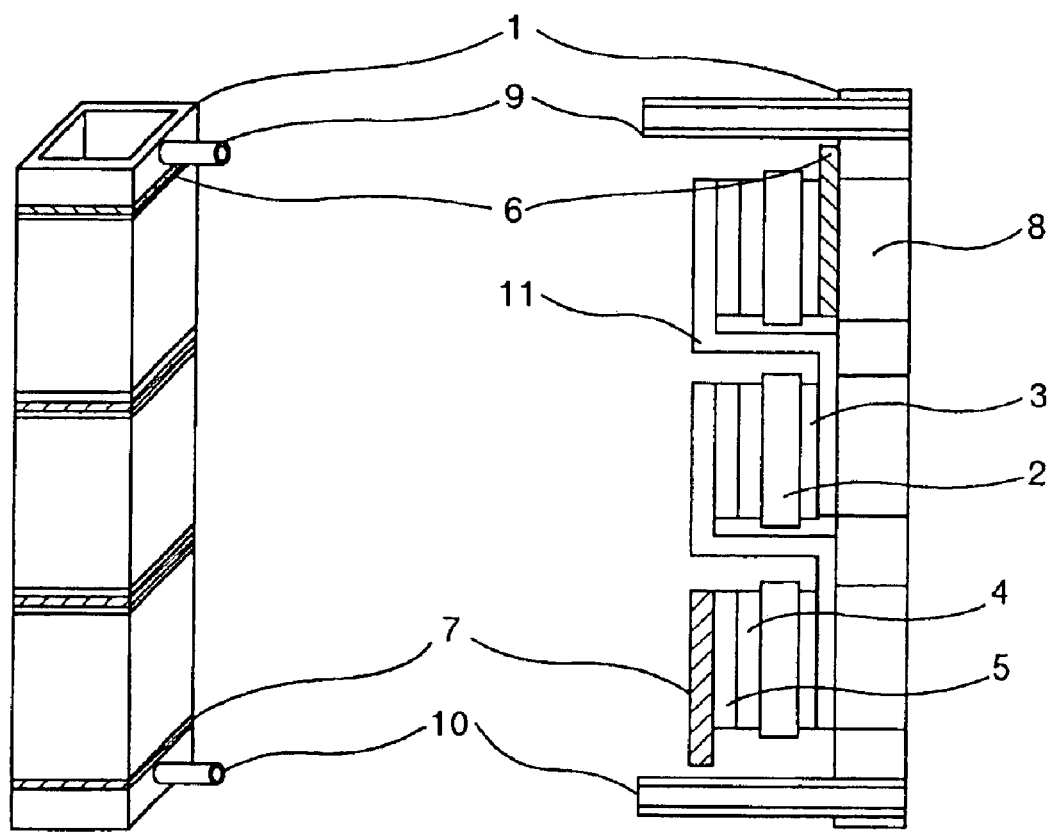
FIG. 3A is an outside construction view of a high-voltage fuel cell unit in accordance with the present invention.
FIG. 3B is a sectional configuration view thereof.

Next, a construction for obtaining a higher voltage per fuel cell unit will be described in detail with reference to FIG. 3A showing the appearance of the fuel cell unit and FIG. 3B showing one sectional construction of the wall thereof.

In this case, the hollow support 1 must be formed of an electrical insulating material, and a plurality of net-like or porous layers 8 are provided in a stripe form at the outer periphery, the layer 8 forming a generator section of the hollow support 1 to which the conductive anode collector 6 is applied. The fuel discharge port 9 and supply port 10 are provided at the upper and lower parts of the fuel cell unit, respectively. The unit cell is formed by laminating the conductive porous anode collector 6, the anode 3, the electrolyte membrane 2, the cathode 4, the diffusion layer 5, and the net-like or porous cathode collector 7 in that order from the outside wall surface of the support 1, and the cathode collector is connected to the adjacent anode collector via an interconnector 11, by which cells are connected in series. The unit cell is formed by the same method as described above. An output terminal is taken out from the anode collector 6 at one end and the cathode collector 7 on the other end.

The fuel tank is a structure that is also used as a platform for a generator formed of one or more tubular fuel cells. The fuel tank is formed of a material having structural strength and corrosion resistance especially to aqueous solution of methanol. There can be used polyethylene, polypropylene, polyethylene terephthalate, vinyl chloride, polyacrylic resins and other engineering resins, an electrical insulating material in which these materials are reinforced by a filler etc., stainless steels, and a material in which the surface of ordinary iron, nickel, copper, aluminum, or an alloy of these metals is subjected to corrosion resisting treatment.

Also, it is effective to use a material in which a base metal having poor corrosion resistance is coated with the aforementioned resin. The fuel tank is provided with mount ports connected to the fuel supply and discharge ports of a plurality of fuel cell units and one or more fuel resupply ports. The constructions of the fuel supply and discharge ports are not subject to any special restriction as long as the ports have an airtight mechanism. In particular, if the fuel supply and discharge ports are detachable, when a part of the fuel cell unit is deteriorated, or other troubles occur, the entire fuel cell module or a specific fuel cell unit is replaced, which provides a preferable construction in which the power source can be used for a long period of time.

During the power generation, the aqueous solution of methanol in the fuel cell unit is oxidized, and thus carbon dioxide is generated and returned to the fuel tank through the discharge port of the fuel cell unit, which increases the pressure in the tank. Also, by a change in environmental temperature, especially by a shift from a low-temperature environment to a high-temperature environment, the pressure in the fuel tank is increased. In order to avoid such a phenomenon, it is effective to provide a mechanism for selectively permeating gas at the fuel resupply port.

Also, as another embodiment, a construction can be adopted in which in addition to the fuel tank serving as a platform for a fuel cell unit group, an auxiliary fuel tank can be mounted on the platform to prolong the duration of power generation. In this case, it is preferable that the platform tank be provided with a receipt port mechanism, and the auxiliary tank be provided with a mount port mechanism and a fuel resupply port having a mechanism for selectively permeating gas.

Figure 4:
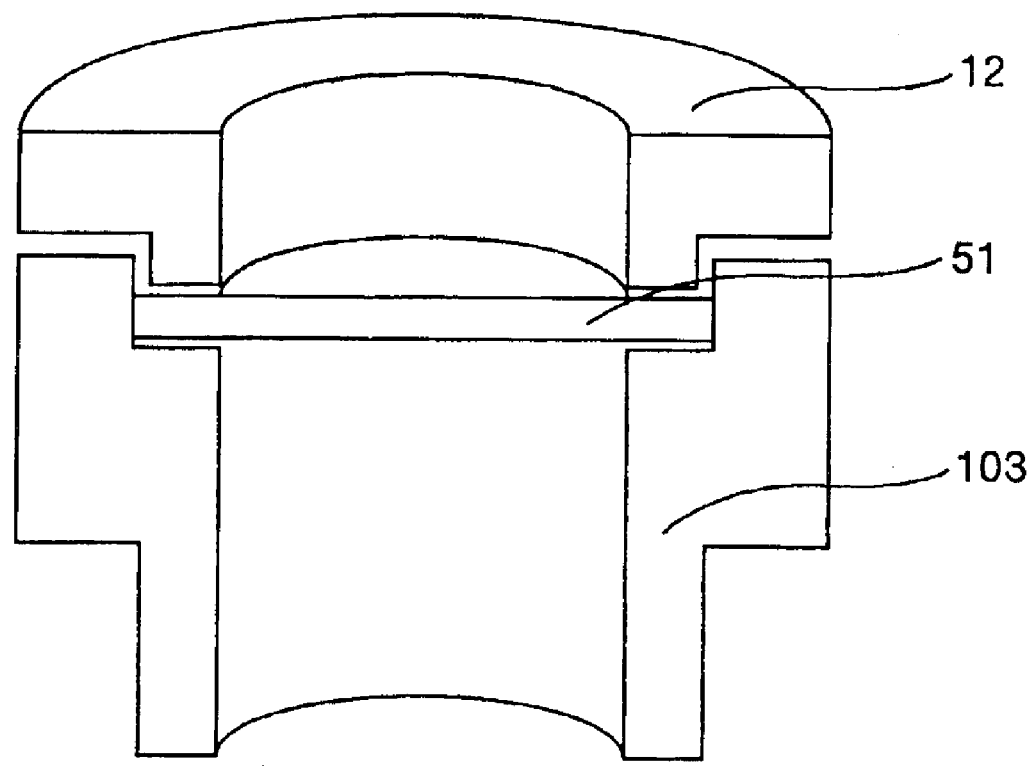
FIG. 4 is a sectional configuration view of a fuel supply port in accordance with the present invention.

FIG. 4 shows a cross-sectional construction of a specific embodiment of the mechanism for selectively permeating gas. A lid 12 for a fuel resupply port 103 is provided with a plate formed with one or more pinholes whose inside surface is water repellent or a porous water repellent plate 51. The lid 12 and the fuel resupply port 103 and the fuel supply port and the fuel tank are fixed to each other with a screw construction having airtightness. If the gas temperature in the tank is increased by the generation of carbon dioxide due to power generation or the rise in environmental temperature, gas is selectively permeated or discharged through many pinholes or porous plate, so that liquid fuel does not flow out.

The fuel cell unit having a plurality of generator sections each provided with the anode, electrolyte membrane, and cathode around the hollow support, which are a characteristic of the present invention, is manufactured, the generator sections are connected in series by the conductive interconnector to achieve high voltage, and the fuel tank is connected as the platform. Thereby, a small power source can be realized in which fuel is supplied into the hollow support without the use of a forced supply mechanism, an oxidizer is supplied from the outside surface of each fuel cell unit by the diffusion of oxygen in air, and power generation can be continued for a long period of time by using aqueous solution of methanol having a high volumetric energy density as liquid fuel. This small power source can be driven by being incorporated as a power source for, for example, a cellular phone, a book type personal computer, and a portable video camera, and the long-term continued use of the power source can be achieved by successively replenishing the fuel having been prepared in advance.

Also, in order to significantly decrease the frequency of fuel replenishment as compared with the above-described case, it is effective to use this small power source as a battery charger by connecting the power source to a charger for, for example, a cellular phone, a book type personal computer, and a portable video camera, which are mounted with a secondary battery, and by mounting it at a part of a storage case thereof. In this case, when the portable electronic equipment is being used, the equipment is taken out of the storage case and is driven by the secondary battery, and when the equipment is not in use, the equipment is stored in the storage case, and the small fuel cell generator incorporated in the storage case is connected to the equipment via the charger to charge the secondary battery. Thereby, the capacity of fuel tank can be increased, and thus the frequency of fuel replenishment can be decreased significantly.

DESCRIPTION OF PREFERRED EMBODIMENTS

The present invention will now be described in more detail with reference to embodiments. The gist of the present invention is not limited to the embodiments described below.

The following will be a description of a first embodiment of the present invention.

Figures 5A, 5B:
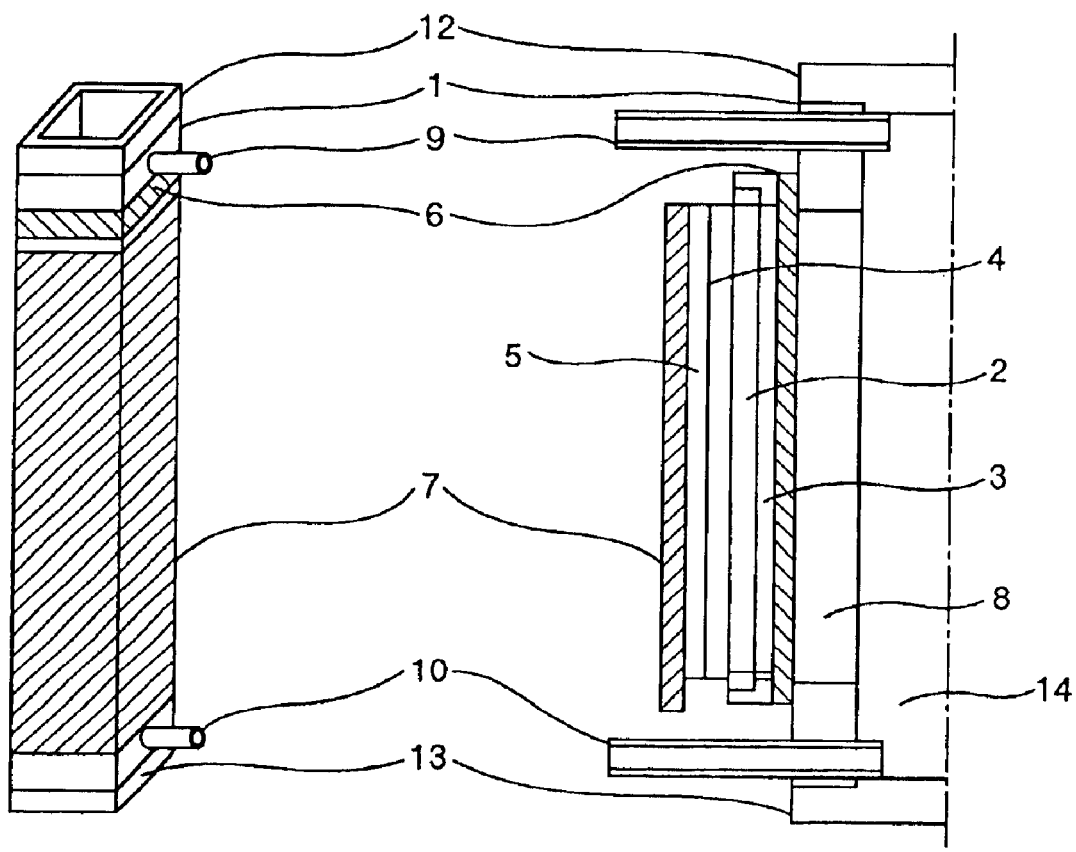
FIG. 5A is an outside construction view of a square tubular fuel cell unit in accordance with the present invention.
FIG. 5B is a sectional configuration view thereof.

An outside construction of a tubular fuel cell unit in accordance with the first embodiment of the present invention is shown in FIG. 5A, and the sectional configuration thereof is shown in FIG. 5B.

The hollow support 1 was made of a 0.4 mm thick stainless steel SUS304 coated with hydroxyl group containing polyacrylic resin clear paint (manufactured by Kansai Paint Co., Ltd.), and was a square tubular vessel having outside dimensions of 4 mm×3 mm and a height of 44 mm. The hollow support 1 was filled with glass fiber with a porosity of 85% as the liquid holding material 14.

The square tube was provided with airtightness by bonding lids 12 and 13 of an acrylic board with a thickness of 2 mm to the top and bottom of the tube, respectively.

On the outer peripheral surface of the square tube, there is provided the porous layer 8 with a porosity of about 70%, which is formed with through holes with a diameter of about 1 mm, and in the upper and lower portions without holes on the side of square tube, there are provided the fuel discharge port 9 and the supply port 10, which have an outside diameter of 3 mm and an inside diameter of 2 mm.

The porous layer 8 of this square tube was covered with a stainless steel SUS316 mesh serving as an anode collector 6, 5% by weight of aqueous solution of Nafion 117 alcohol (mixed solvent of water, isopropanol, and normal propanol in the weight ratio of 20:40:40, manufactured by Fluke Chemical Corp.), in which the electrolyte amount corresponded to 60 wt % of catalyst amount by dry weight, was added to a platinum-ruthenium carrying carbon catalyst and was kneaded to form paste, and the paste was applied onto the mesh so that the thickness after drying was performed at 60° C. for three hours was 30 μm, by which the anode 3 was formed.

After drying was performed at a temperature of about 60° C. for three hours, the quantity of platinum was 2 mg/cm$^2$, and the quantity of ruthenium was 1 mg/cm$^2$.

Then, after the drying at 60° C., 5% by weight of aqueous solution of Nafion 117 alcohol was evaporated, and a liquid concentrated to about 30% by weight was applied to the entire outer peripheral surface of square tube so that the electrode section had a thickness of about 50 μm, by which the electrolyte membrane 2 was formed.

After drying was performed at room temperature for 10 hours and subsequently drying was performed at 60° C. for three hours, the coat thickness in the non-electrode section was measured. The measurement result was such that although the corner portion of the square tube had a slightly greater thickness, the flat portion thereof had a thickness in the range of 73 to 76 μm, and the thickness of electrolyte membrane in the current carrying portion was about 45 μm.

Five percent by weight of aqueous solution of Nafion 117 alcohol, in which Nafion 117 corresponded to 60 wt % of catalyst amount by dry weight, was added to a platinum carrying carbon powder catalyst and was kneaded to form paste, and the paste was applied onto the formed electrolyte membrane 2 in such a manner as to overlap with the anode 3 so that the thickness after drying was 15 μm, by which the cathode 4 was formed after drying at 60° C. for three hours. The quantity of platinum at this time was about 0.8 mg/cm$^2$.

Next, aqueous dispersion of water repellant of fine particles of polytetrafluoroethylene (Teflon Dispersion D-1, manufactured by Daikin Industries, Ltd.) was added to carbon powders so that the weight after firing was 40 wt %, and kneaded to form paste. The paste was applied onto one surface of carbon fiber nonwoven fabric having a thickness of about 100 μm and a porosity of 87% so that the thickness was about 20 μm, and drying was performed at room temperature and then firing was performed at 270° C. for three hours to form the diffusion layer 5.

The obtained diffusion layer 5 was cut into a tape shape having the same width as the cathode width of the square tubular fuel cell, and the tape was wound on the cathode of the square tubular fuel cell so that the joints did not lap on each other. Thereby, a stainless steel SUS3316 mesh was fixed to the diffusion layer 5 as the cathode collector 7. To the end portions of the anode and cathode collectors 6 and 7, terminals of the fuel cell unit were connected.

Figure 6:
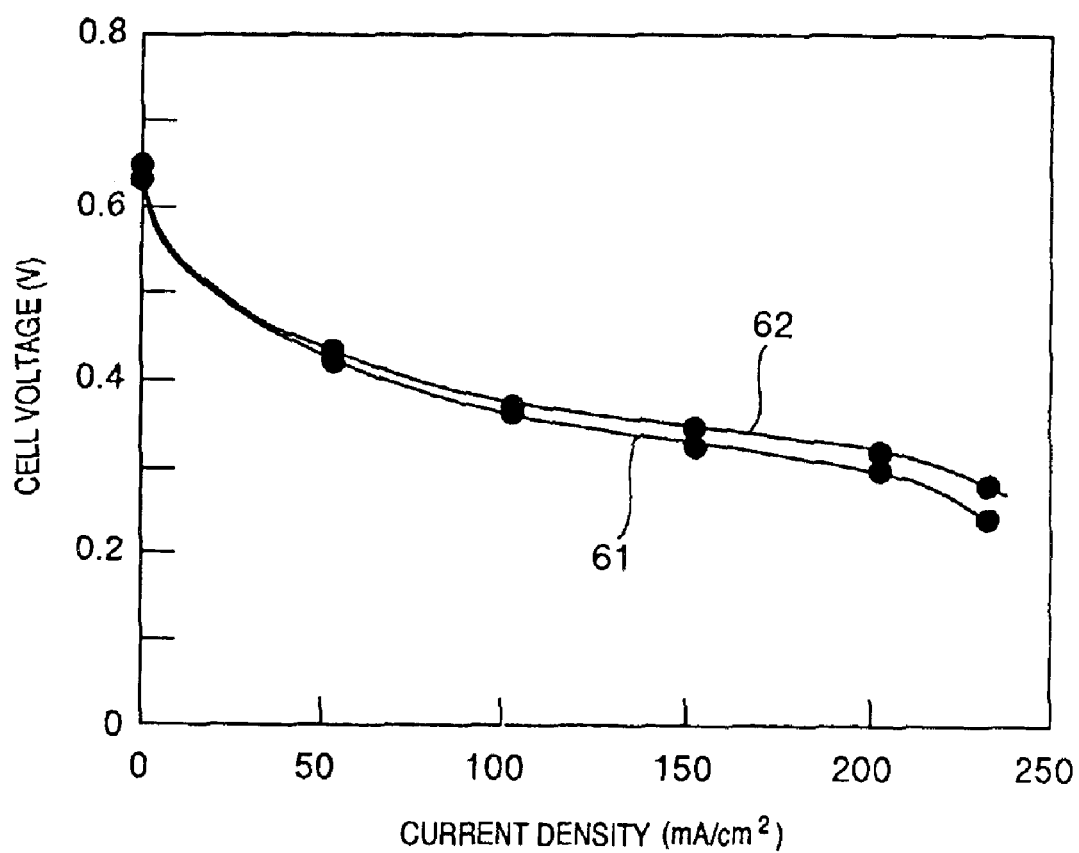
FIG. 6 is a current/voltage characteristic diagram for a fuel cell unit in accordance with a first embodiment and a second embodiment.

The square tubular fuel cell unit obtained in this manner was a single cell having a fuel filling volume of about 0.26 cm$^3$ and a power generation effective area of about 5 cm$^2$. The current/voltage characteristics of initial characteristics of unit cell at 55° C., which was measured by filling 10 wt % of aqueous solution of methanol as a liquid fuel, exhibited an output voltage of 0.30 V at a load current density of 150 mA/cm$^2$ as indicated by curve 61 in FIG. 6. When a power source is formed by mounting a plurality of fuel cell units having such a construction, the fuel cell units can be arranged and mounted in a compact manner merely by providing a space necessary and sufficient for the diffusion of air.

The following will be a description of a second embodiment of the present invention.

Figures 7A, 7B:
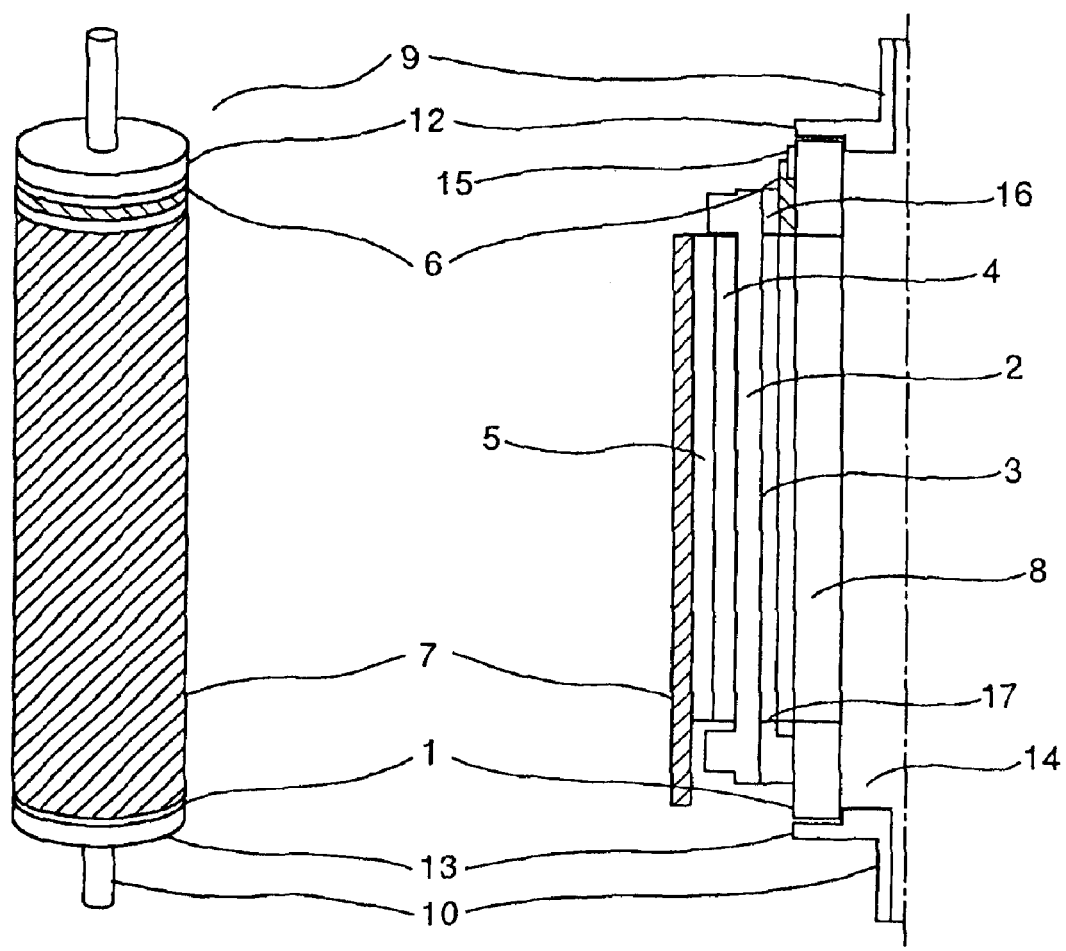
FIG. 7A is an outside construction view of a cylindrical fuel cell unit in accordance with the present invention.
FIG. 7B is a sectional configuration view thereof.

An outside construction of a fuel cell unit having a cylindrical construction, which uses aqueous solution of methanol as a fuel, in accordance with another embodiment of the present invention is shown in FIG. 7A, and a sectional configuration thereof is shown in FIG. 7B.

The hollow cylindrical support 1 was formed of a polypropylene-made cylinder measuring 4.5 mm in outside diameter, 3.6 mm in inside diameter, and 44 mm in length, and a copper-made anode terminal strip 15 with a width of 3 mm and a thickness of 0.2 mm fitted beforehand around one end of the cylinder. The anode collector 6 was formed by applying a conductive carbon paint with a thickness of about 50 μm around the support 1 with polyvinylidene fluoride being used as a binder. On a 38 mm wide cylindrical wall surface to which the anode collector 6 is applied, the porous layer 8 was provided in which through holes 8 with a diameter of about 0.5 mm were formed so that the porosity was about 65%.

Glass fiber with a porosity of 85% was filled into the cylinder as the liquid holding material 14, and the 2 mm thick polypropylene-made lids 12 and 13 having the fuel discharge port 9 and the supply port 10 each having an outside diameter of 3 mm and an inside diameter of 2 mm were welded to the top and bottom of the cylinder, respectively, to provide airtightness. Next, 5% by weight of aqueous solution of Nafion 117 alcohol, in which Nafion corresponded to 60 wt % of catalyst amount by dry weight, was added to a platinum-ruthenium carrying carbon catalyst and kneaded to form paste, and the paste was applied onto the area of 38 mm×12 mm of the electrolyte membrane 2 of Nafion 117 (manufactured by Du Pont) measuring 44 mm×14 mm and 50 μm thick by the screen printing process to form the anode 3. After drying at about 60° C. for three hours, the quantity of platinum was about 1.3 mg/cm$^2$, and the quantity of ruthenium was about 0.65 mg/cm$^2$.

Next, 5% by weight of aqueous solution of Nafion 117 alcohol, in which Nafion corresponded to 60 wt % of catalyst amount by dry weight, was added to a platinum carrying carbon powder catalyst and kneaded to form paste, and the paste was applied on the surface opposite to the surface onto which anode 3 had been applied of the electrolyte membrane 2 by the screen printing process in such a manner as to overlap with the anode 3 so that the thickness after drying was 15 μm, by which the cathode 4 was formed after drying at 60° C. for three hours. Thereby, the membrane electrode assembly was formed.

At this time, the quantity of cathode platinum was about 0.8 mg/cm$^2$. Next, aqueous dispersion of water repellant of fine particles of polytetrafluoroethylene was added to carbon powders so that the weight after firing was 40 wt %, and kneaded to form paste. The paste was applied onto one surface of carbon fiber nonwoven fabric having a thickness of about 100 μm and a porosity of 87% so that the thickness was about 20 μm, and drying was performed at room temperature and then firing was performed at 270° C. for three hours to form the diffusion layer 5.

A silicone liquid gasket 16 was applied to potions with a width of about 2.5 mm in which electrolyte membrane of the upper and lower peripheries of the membrane electrode assembly was exposed and was wound so as to cover the porous layer 8 of the cylindrical hollow support 1, and the upper and lower ends were bonded. A liquid formed by concentrating 5% by weight of aqueous solution of Nafion 117 alcohol to about 30% by weight was applied to the electrolyte membrane joint exposed in the lengthwise direction of the cylindrical support 1 of the membrane electrode assembly while the electrolyte membrane is tightened from the outer periphery, and the joint was connected by drying at 60° C. for about three hours.

The obtained diffusion layer 5 was cut into a tape shape having the same width as the cathode width, and the tape was wound on the cathode of the cylindrical fuel cell so that the joints did not lap on each other. A copper-made mesh was fixed to the porous cathode collector 7 coated with a conductive carbon paint with polyvinylidene fluoride being used as a binder so that the mesh was used as the cathode terminal.

Also, seal portions at both ends of the cylindrical fuel cell unit were tightened with a rubber-based tightening band 17 and were fixed. The obtained cylindrical fuel cell unit was a single cell having a fuel filling volume of about 0.37 cm$^3$ and a power generation effective area of about 4.5 cm$^2$. The initial current/voltage characteristics of unit cell at 55° C., which was measured by filling 10 wt % of aqueous solution of methanol as a liquid fuel, exhibited an output voltage of 0.32 V at a load current density of 150 mA/cm$^2$ as indicated by curve 62 in FIG. 6.

If the fuel cell unit is formed into a cylindrical shape as in the case of this embodiment, a process for joining cell members at the outer periphery of the hollow support can be made easy, the tightening by the porous cathode collector 7 can be made uniform, and the output voltage of unit cell can be made high.

The following will be a description of a third embodiment of the present invention.

An outside construction of a high-voltage fuel cell unit having a cylindrical construction, which uses aqueous solution of methanol as a fuel, in accordance with still another embodiment of the present invention is shown in FIG. 8A, and a sectional configuration thereof is shown in FIG. 8B.

A polypropylene-made hollow cylinder measuring 6.4 mm in outside diameter, 5.5 mm in inside diameter, and 90 mm in length, which had two ribs 21 with a width of 1.5 mm and a height of 50 $\mu$m at the outer periphery thereof at positions 30 mm from both ends was manufactured, and the copper-made anode terminal strip 15 with a width of 3 mm and a thickness of 0.2 mm was fitted beforehand around a portion where the 3 mm wide upper end portion of the cylinder was cut to an outside diameter of 6.0 mm, by which the hollow cylindrical support 1 was formed. The outer peripheral surface excluding the anode collector 6 on the rib surface and at the support end was masked by a resin tape, and a conductive carbon paint with a thickness of 50 $\mu$m was applied to the remaining outer peripheral surface with polyvinylidene fluoride being used as a binder, by which the anode collector 6 connected by the interconnector 11 was formed. Three collector forming sections each having a width of 25 mm were provided in contact with one side face of the rib so that through holes with a diameter of about 0.5 mm were formed with a porosity of about 65%, by which the porous sections 8 were formed. Onto the surface of collector divided into three, the anode 3 with a thickness of 30 $\mu$m was applied by the same method as that of the first embodiment. Then, the anode collector of the rib 21 and the interconnector 11 was masked, and the electrolyte membrane 2 was formed on the anode 3 formed in the current carrying portion and in a portion of anode collector that was not masked by the same method as that of the first embodiment so that the current carrying portion had a thickness of about 40 $\mu$m.

Next, the cathode 4 with a thickness of 15 $\mu$m was formed on the electrolyte membrane 2 at a position such as to overlap with the anode 3 by the same method as that of the first embodiment. The diffusion layer 5 formed by the same method as that of the first embodiment and the cathode collector 7 that is the same as that used in the second embodiment 2 were lapped on each other, and the outer periphery was fixed by a polyethylene-made tightening mesh 20.

Then, the mask on the anode collector was removed and the side faces of the cathode 4 and the diffusion layer 5 were masked. Thereafter, a conductive paint was poured in the anode collector with nickel metal powders being used as a filler and polyvinylidene fluoride being used as a binder, and was electrically connected to the side faces of the adjacent cathode 4 and diffusion layer 5.

Glass fiber with a porosity of 85% was filled into the cylinder of the obtained cylindrical fuel cell unit as the liquid holding material 14, and the 2 mm thick polypropylene-made lids 12 and 13 having the fuel discharge port 9 and the supply port 10 each having an outside diameter of 3 mm and an inside diameter of 2 mm were welded to the top and bottom of the cylinder, respectively, to provide airtightness. An anode terminal 18 was pulled out of the anode terminal strip 15, and a cathode terminal 19 was pulled out of the lower end portion of the cathode collector 7. The obtained cylindrical fuel cell unit formed by connecting three single cells in series was a single cell having a fuel filling volume of about 1.8 cm$^3$ and a power generation effective area of about 5 cm$^2$. The voltage of a load current of 0.8 A at 55° C., which was measured by filling 10 wt % of aqueous solution of methanol as a liquid fuel, was about 0.98 V as indicated by curve 71 in FIG. 11.

For the cylindrical fuel cell unit having such a construction, as in the case of the second embodiment, the joining process for the cell members can be made easy, and the output voltage of unit cell can be made high. Also, since the output voltage of fuel cell unit can be made high, the degree of freedom of selecting the height of cell can be provided. Especially in the case where the load current is relatively small, and a high voltage is needed, this construction enables the power source to be manufactured in a compact manner.

The following will be a description of a fourth embodiment of the present invention.

Figures 10A, 10B:
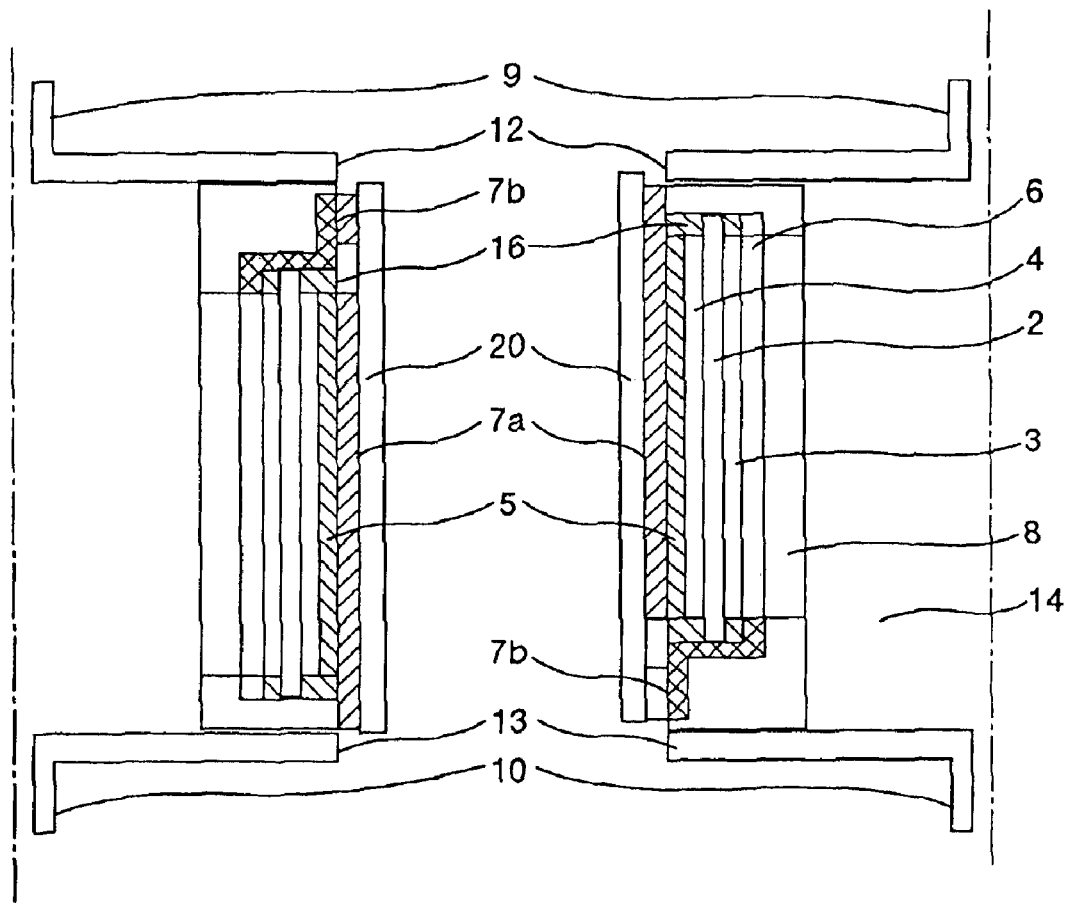
FIGS. 10A and 10B are sectional configuration views of a high-voltage square tubular fuel cell unit in accordance with the present invention.

An outside construction of a high-voltage fuel cell unit having a square tubular construction, which uses aqueous solution of methanol as a fuel, in accordance with still another embodiment of the present invention is shown in FIG. 9A, and an outside construction thereof before the polyethylene mesh 20 for tightening the fuel cell unit is mounted is shown in FIG. 9B. Also, one sectional configuration of the support 1 is shown in FIG. 10A, and another sectional configuration adjacent to the above is shown in FIG. 10B.

As shown in FIG. 9B, the hollow support 1 of the fuel cell unit was formed of a polypropylene-made square tube having an outside dimensions of 10 mm×10 mm×115 mm and a thickness of 1 mm. On each of four outside surfaces of the square tube was provided a cell mounting portion having an engraved construction measuring 9 mm×104 mm and 200 $\mu$m deep, and as shown in FIGS. 10A and 10B, a conductive carbon paint with a thickness of about 50 $\mu$m was applied onto this surface and over the anode end face with polyvinylidene fluoride being used as a binder, by which the anode collector 6 was formed.

Next, a region of 5 mm×100 mm in the cell mounting portion was made a current carrying portion, and there was provided the porous section 8 so that through holes with a diameter of about 0.5 mm were formed with a porosity of about 65%. Glass fiber with a porosity of 85% was filled into the square tube as the liquid holding material 14, and the 2 mm thick lids 12 and 13 having the fuel discharge port 9 and the supply port 10, respectively, were mounted to provide airtightness.

By the same method as that of the second embodiment, a platinum-ruthenium carrying carbon catalyst for anode catalyst, a platinum carrying carbon powder catalyst for cathode catalyst, and Nafion membrane 117 (manufactured by Du Pont) with a thickness of 50 $\mu$m for electrolyte membrane were used, and the anode 3 having dimensions of 5 mm×100 mm and a thickness of 25 $\mu$m and the cathode 4 having a thickness of 15 $\mu$m were lapped on both surfaces of the electrolyte membrane 2 having dimensions of 9 mm×104 mm, by which the membrane electrode assembly was manufactured.

Next, the peripheral electrolyte membrane and the cell mounting portion of the membrane electrode assembly were bonded to each other with the silicone liquid gasket 16 so that the anode side of the membrane electrode assembly was in contact with the cell mounting portion of the hollow support. The diffusion layer 5 that was the same as that used in the second embodiment and a cathode collector 7a of a shape such that a tab 7b was provided at the end that was manufactured by the same method as that of the second embodiment were lapped on the surface of the mounted cathode, and the outer peripheral portion was fixed with the polyethylene-made tightening mesh 20 via the silicone liquid gasket 16 provided between the electrolyte membrane 2 and the cell mounting portion.

As shown in FIG. 10B, the tab portions of the cathode collectors 7 mounted on four surfaces of the hollow support were lapped on each other in the vertically reverse direction alternately, and each tab was bonded to the adjacent anode collector 7, by which a cell group consisting of four single cells connected in series was formed.

Figure 11:
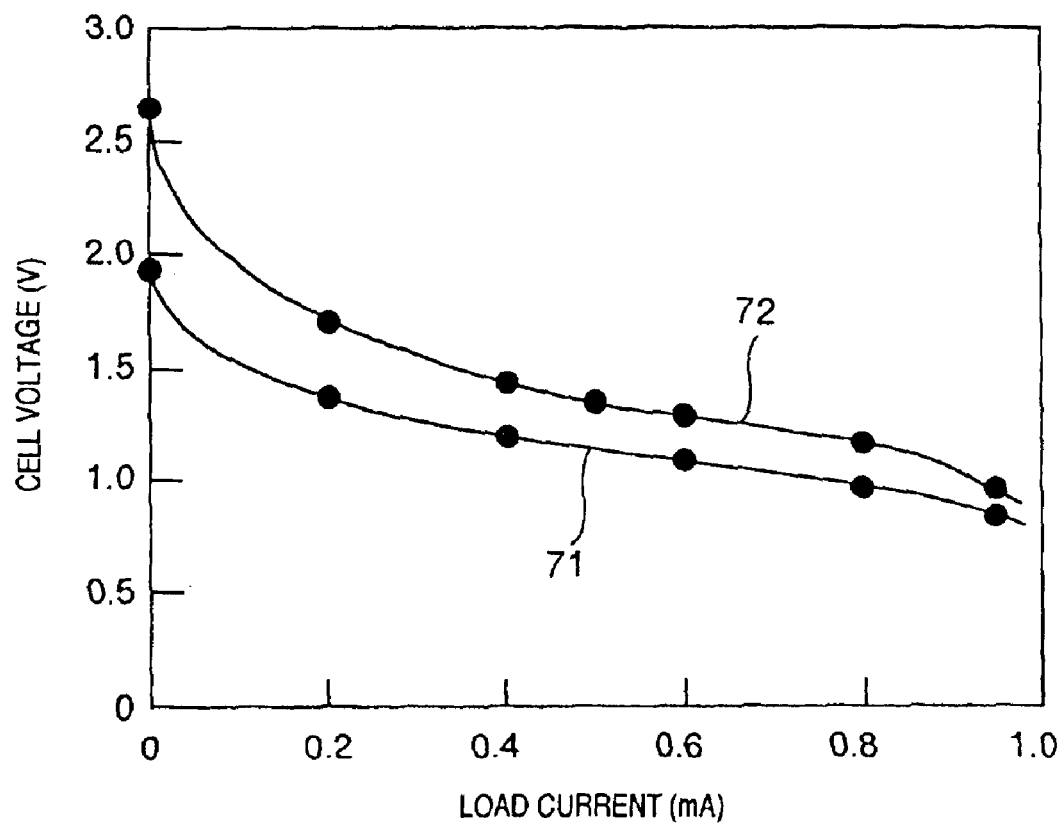
FIG. 11 is a current/voltage characteristic diagram for a fuel cell unit in accordance with a third embodiment and a fourth embodiment.

The obtained tubular fuel cell unit had a power generation effective area of about 5 cm², and the fuel cell unit using 10 wt % of aqueous solution of methanol as a liquid fuel exhibited performance of voltage of 1.3 V at an output current of 0.5A as indicated by curve 72 in FIG. 11 at an operating temperature of 60° C. For such a construction of the square tubular fuel cell unit, since each square tube forms a cell independently, the joining process for the cell members can be made easy, and the output voltage of unit cell can be made high. Also, since the output voltage of fuel cell unit can be made high, the degree of freedom of selecting the height of cell can be provided. Especially in the case where the load current is relatively small, and a high voltage is needed, this construction enables the power source to be manufactured in a compact manner.

Figures 12A, 12B:
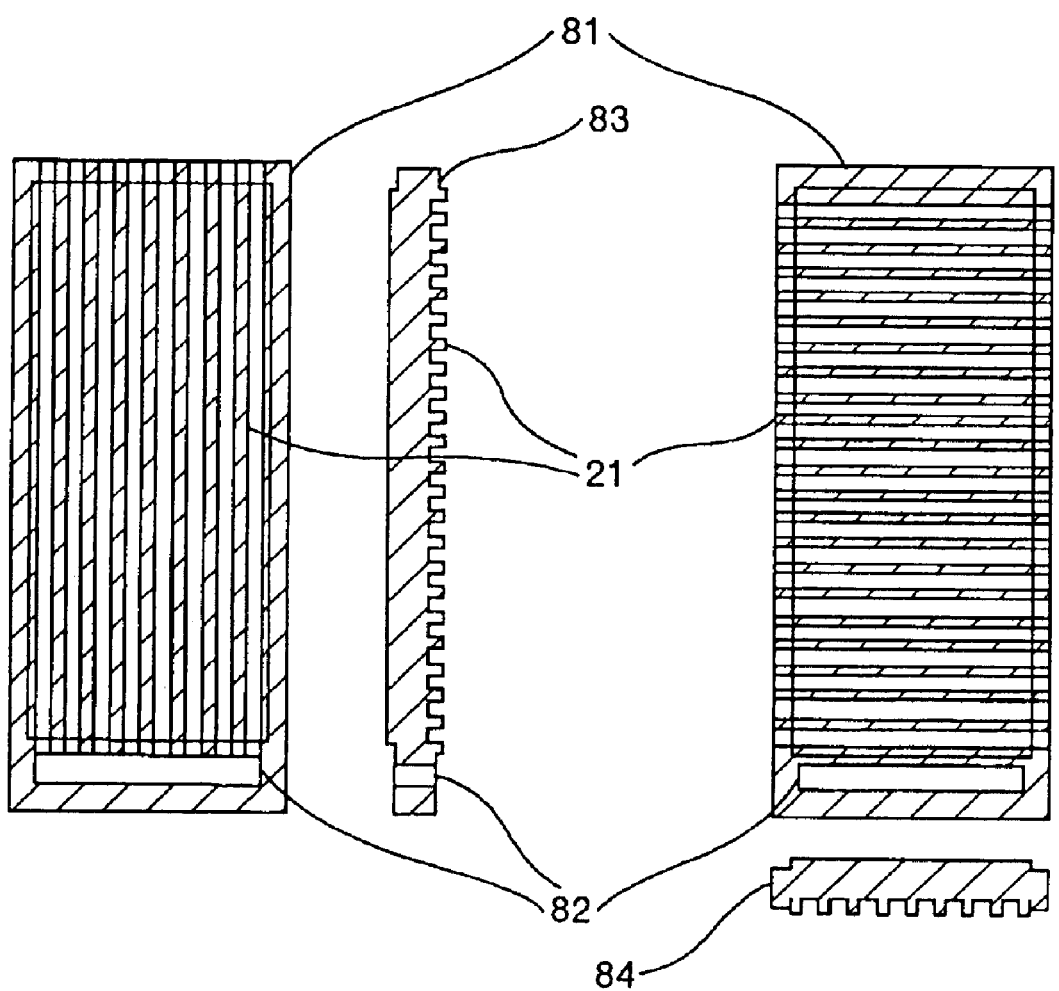
FIGS. 12A and 12B are views showing outside construction and sectional construction of a separator in accordance with a comparative example.
Figure 13:
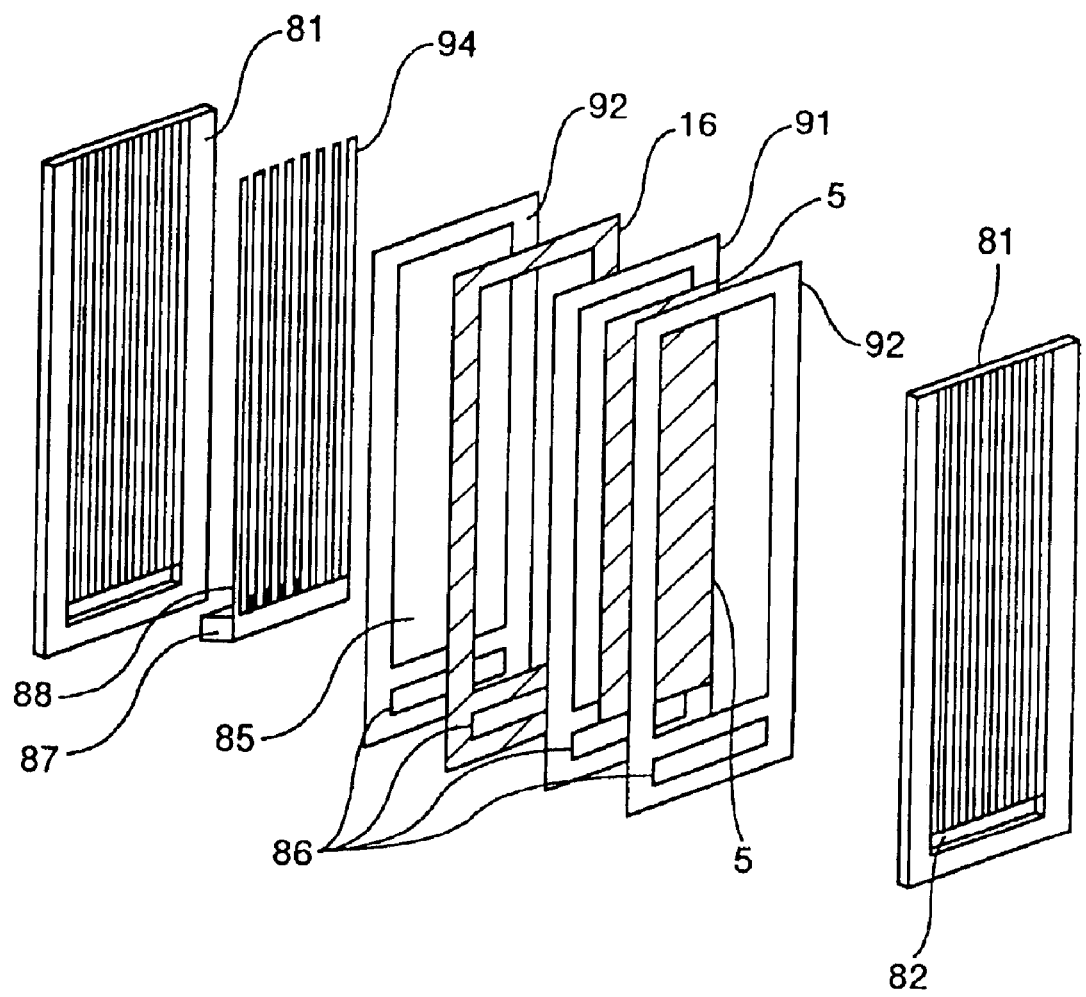
FIG. 13 is a view showing a laminating configuration of a cell in accordance with a comparative example.
Figure 14:
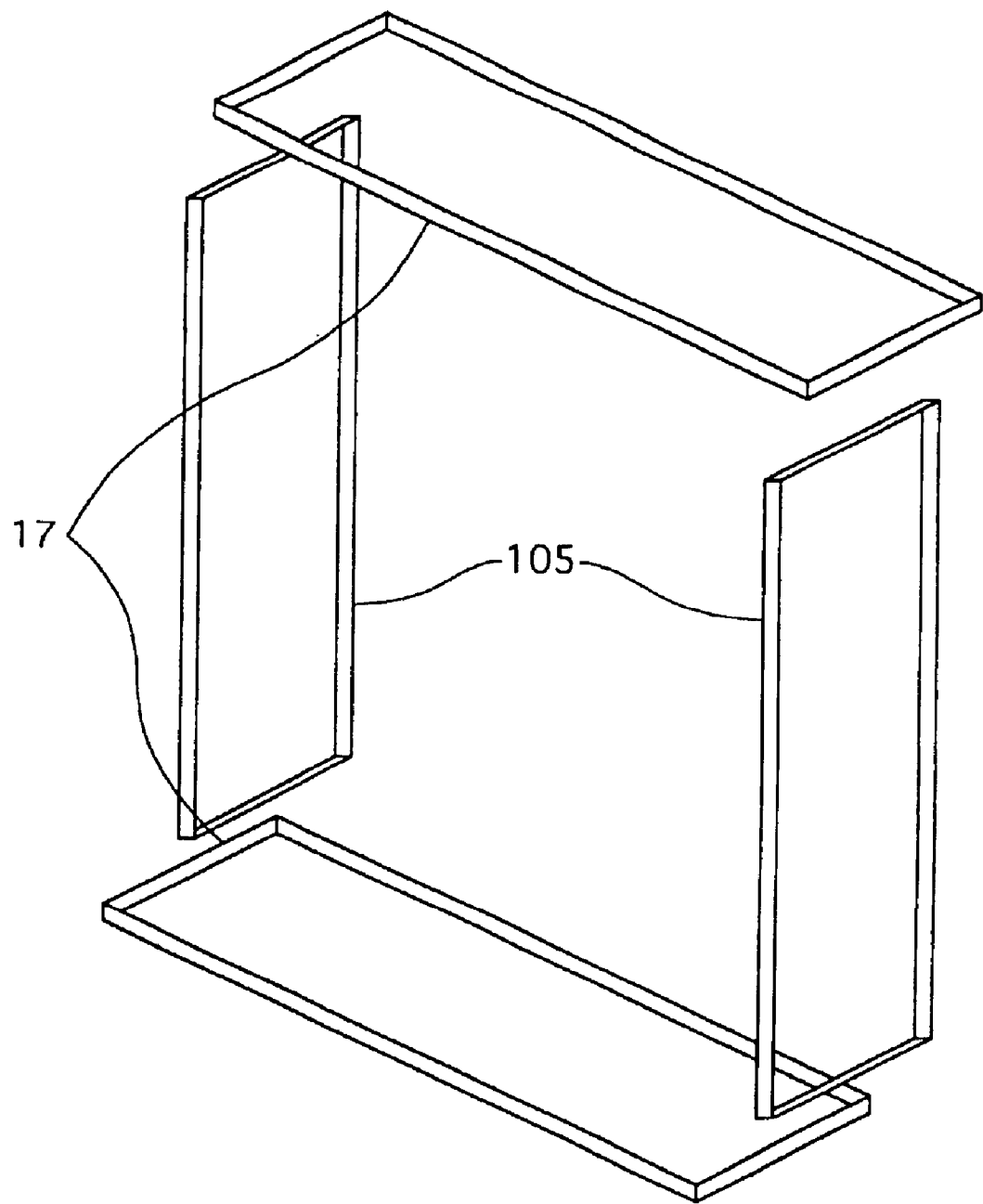
FIG. 14 is a construction view of a cell holder and a tightening band for a cell in accordance with a comparative example.

As comparative example 1, one in-plane construction and the longitudinal cross section of a separator in accordance with the conventional construction is shown in FIG. 12A, and the other in-plane construction and the longitudinal cross section is shown in FIG. 12B. Also, a laminating configuration of a cell is shown in FIG. 13, and a construction of a cell holder is shown in FIG. 14. Further, a construction of a power source system in which fourteen single cells are laminated in series and a fuel tank is provided is shown in FIG. 15.

As the separator, a graphitized carbon plate measuring 50 mm×21 mm and 3 mm thick was used. At the bottom of the separator 81 was provided an internal manifold 82 having dimensions of 5 mm×15 mm. As shown in FIG. 12A, grooves each measuring 1 mm wide×0.8 mm deep×39 mm long were formed at intervals of 2 mm to form ribs 21, and fuel supply grooves connecting the manifold 82 to the upper side face of the separator 81 were provided. As shown in FIG. 12B, in the direction perpendicular to the above in the other surface, grooves each measuring 1 mm wide×1.4 mm deep×21 mm long were formed at intervals of 2 mm to form ribs 21, and oxidizer supply grooves connecting the side faces of the separator 81 to each other were provided. Next, Nafion 117 measuring 50 mm×21 mm and 50 $\mu$m thick serving as the electrolyte membrane was provided with a manifold hole 86, and the anode with a thickness of 25 $\mu$m was applied onto one surface of the generator section measuring 36 mm×14 mm and the cathode with a thickness of 15 $\mu$m was applied onto the other surface thereof by the same method as that of the second embodiment, by which a membrane electrode assembly 91 was manufactured.

As the anode catalyst, a catalyst in which a platinum-ruthenium alloy catalyst was carried in a carbon carrier was used. As the cathode catalyst, a catalyst in which platinum was carried in a carbon carrier was used. The quantity of platinum for anode was about 1.3 mg/cm², and the quantity of ruthenium therefor was about 0.65 mg/cm². The quantity of platinum for cathode was about 0.8 mg/cm².

Then, a 250 $\mu$m thick polyethylene terephthalate liner 92, which had the same size as that of the separator 81 and was provided with a manifold hole 86 and a generator section hole 85, and a 400 $\mu$m thick neoprene gasket 16 were manufactured. Also, the diffusion layer 5 was manufactured by the same method as that of the first embodiment.

Figures 15A, 15B:
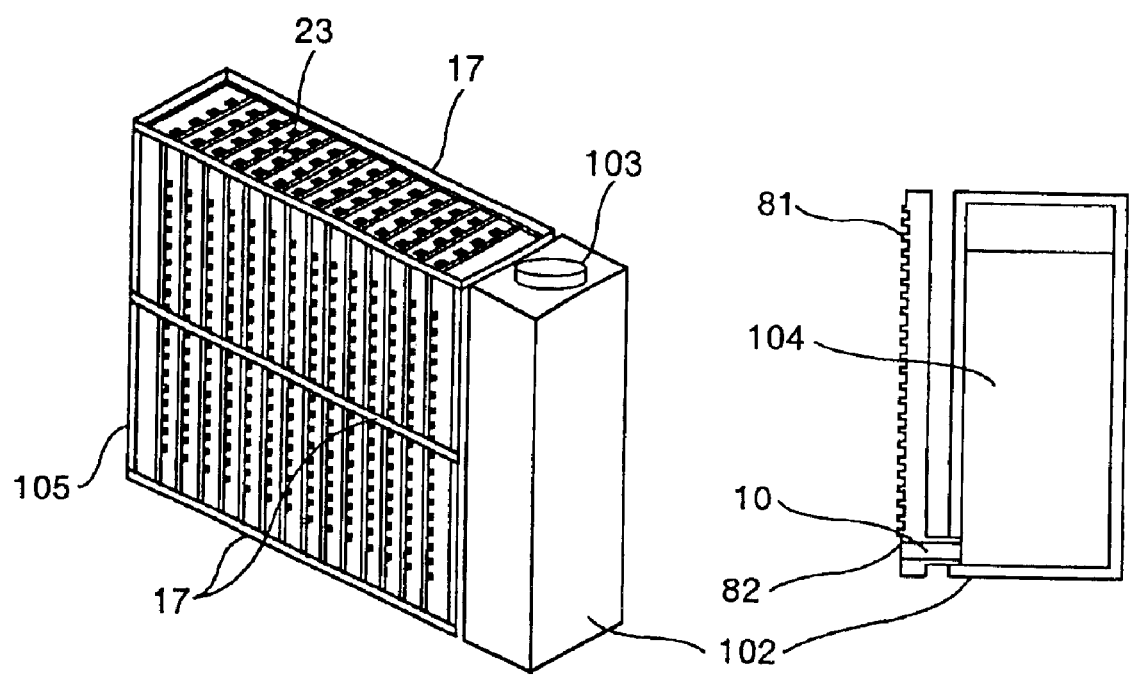
FIG. 15A is an outside construction view of a power source.
FIG. 15B is a sectional view showing a state in which a fuel tank is connected in accordance with a comparative example.

Next, a pulpboard-made sucking-up element 94 composed of a portion 88 embedded in the groove on the fuel electrode side of the separator 81 and a portion 87 embedded in the manifold thereof was manufactured. The separator 81, sucking-up element 94, liner 92, gasket 93, membrane electrode assembly 91, diffusion layer 5, liner 92, and separator 81 were piled up in that order as a unit, and fourteen units were laminated and pressed under a pressure of about 5 kg/cm² to form a layer-built cell 23 as shown in FIG. 15. This layer-built cell 23 was fixed by being tightened with tightening bands 17 of fluorine-based rubber (Viton, manufactured by Du Pont) via SUS316 cell holders 105 having a construction shown in FIG. 14 as shown in FIG. 15A. The fuel tank 102 was manufactured which was made of polypropylene, had outside dimensions of 50 mm high× 21 mm long×21 mm wide, and had side walls with a thickness of 0.3 mm.

As shown in FIG. 15B, in the center of the fuel tank 102, there was provided the screwed lid type fuel resupply port 103 provided with a function for selectively permeating gas by mounting a porous polytetrafluoroethylene membrane having a construction shown in FIG. 5, and the fuel tank was filled with aqueous solution of methanol used as the fuel 104.

The manufactured layer-built cell was connected to the fuel tank 102 in such a manner as shown in FIG. 15B, by which a power source having a construction as shown in FIG. 15A was manufactured. The obtained power source had dimensions of approximately 50 mm high×72 mm long×21 mm wide and a power generation area of about 5 cm², and was provided with the fuel tank having a capacity of about 20 cm³.

This power source exhibited a voltage of 2.5 V at a load current of 0.8 A at an operating temperature of 60° C., and the voltage in the case where power was generated while air is fed with a fan to the entire hole portion of the power source side wall formed of grooves on the air electrode side of separator was 4.1 V.

The reason for this is probably that the supply of oxygen due to sufficient air diffusion is insufficient in the groove construction on the air electrode side of separator. The volumetric output density of this power source was about 26 W/l when no fan was used, and was about 43 W/l when a fan was used. When the fuel tank was filled with 19 ml of 10 wt % aqueous solution of methanol, and the power source was operated at a load current of 0.8 A at an operating temperature of 60° C. with the use of a fan, the voltage decreased suddenly after the output voltage of 4.0 V continued for about 25 minutes. Therefore, the volumetric energy density provided by one charge of 10 wt % aqueous solution of methanol was 18 Wh/l when a fan was used.

Figure 16:
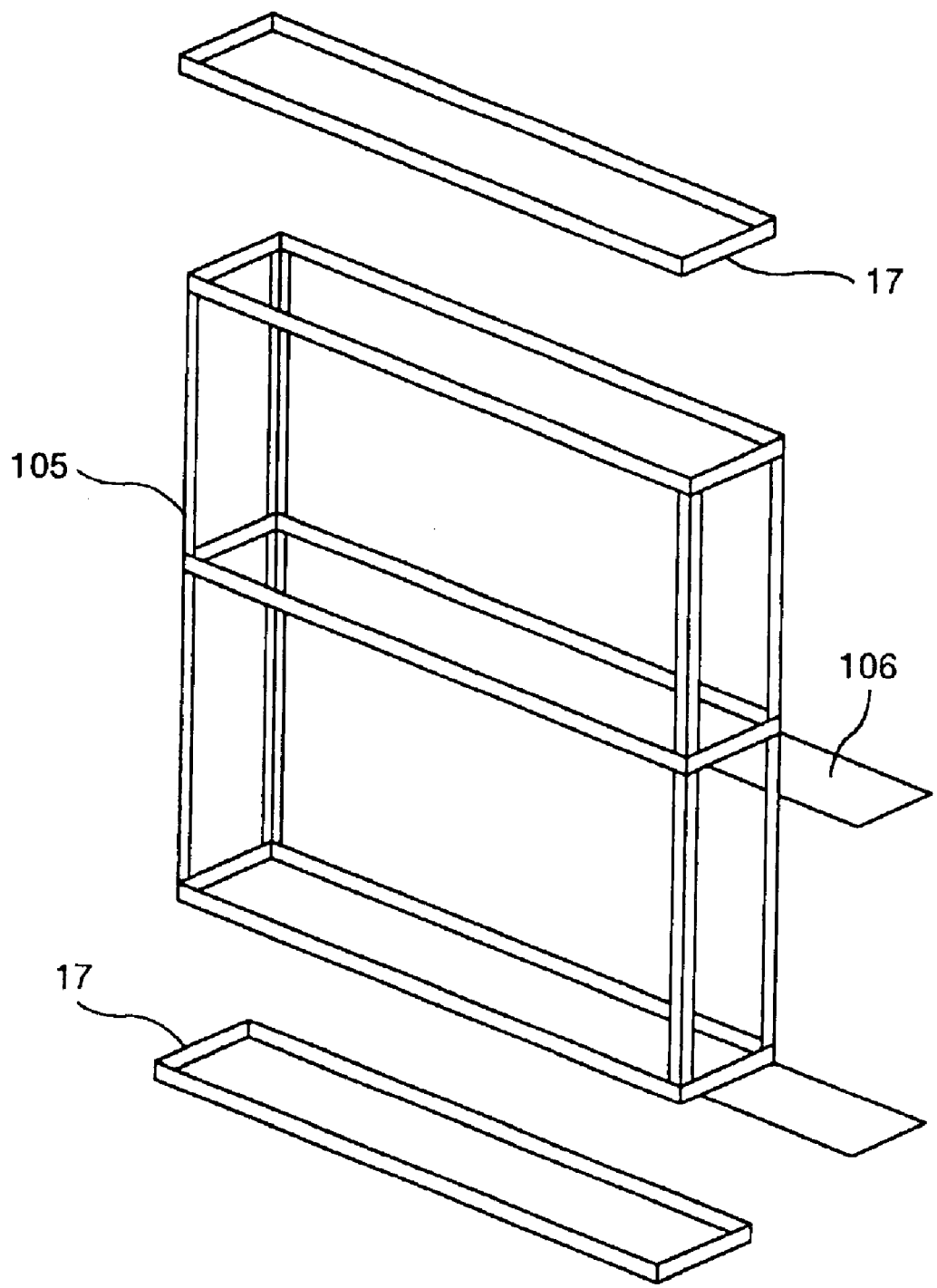
FIG. 16 is a construction view of a cell holder and a tightening band for a cell in accordance with a comparative example.
Figure 17:
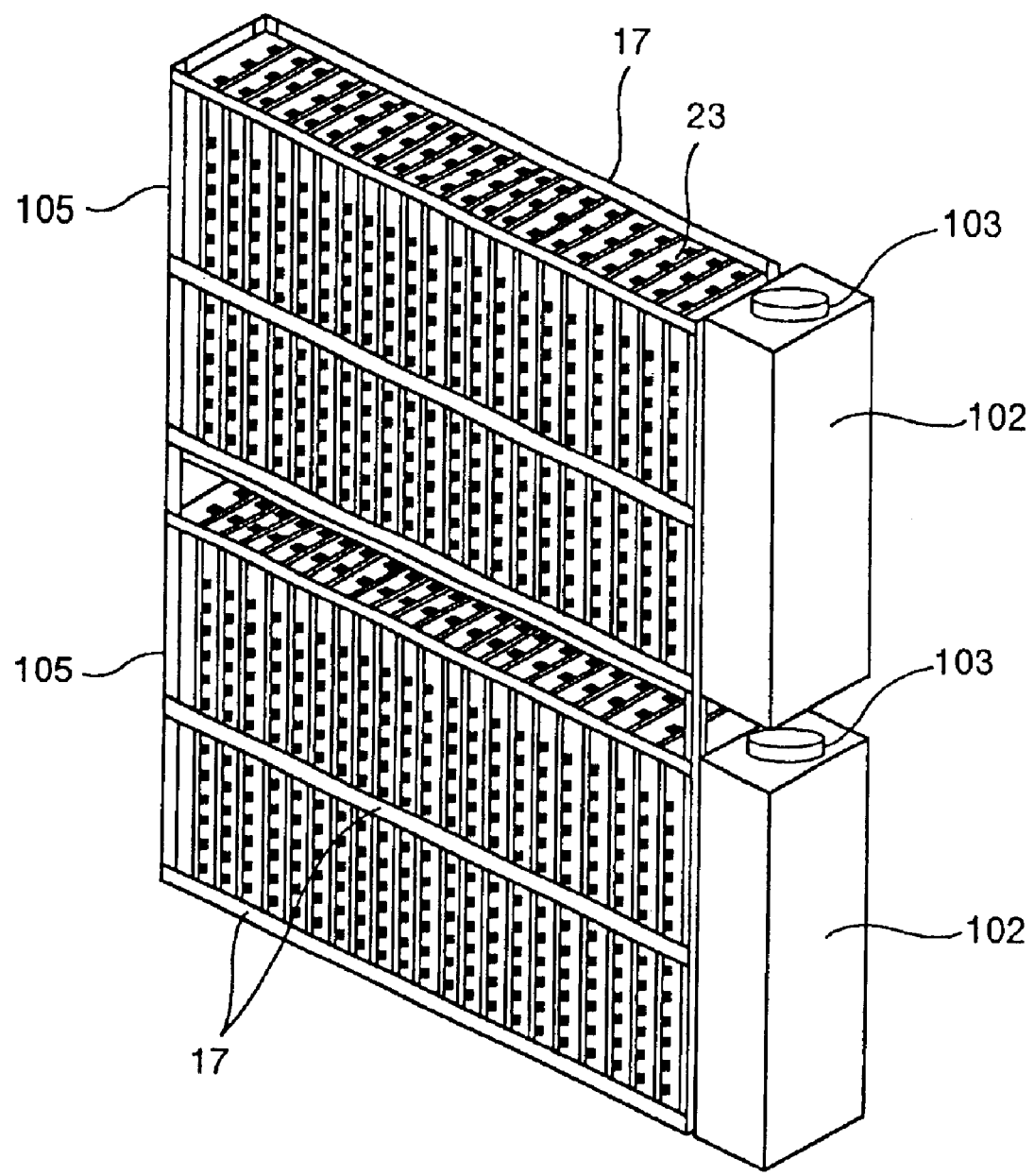
FIG. 17 is an outside construction view of a power source in accordance with a comparative example.

Next, description will be given with reference to FIG. 17 showing a construction of a high-voltage power source using a separator as comparative example 2 and FIG. 16 showing a construction of a cell holder.

The used separator, sucking-up element, liner, gasket, membrane electrode assembly, and diffusion layer, which were components of cell, were made of the same material with the same size as that of comparative example 1, and two sets of layer-built cells 23 were manufactured by the same procedure so that the unit cell consisted of twenty-one cells were provided.

The two sets of layer-built cells were inserted so that the cell bottom face was in contact with a cell fixing plate 106 of the cell holder 105 shown in FIG. 16, and were fixed with the tightening bands 17 of fluorine-based rubber as in the case of comparative example 1. The fuel tank 102 was made of polypropylene, had outside dimensions of 50 mm high× 21 mm long×35 mm wide, and had side walls with a thickness of 0.3 mm.

As shown in FIG. 17, in the center of the fuel tank 102, there was provided the screwed lid type fuel resupply port 103 provided with a function for selectively permeating gas by mounting a porous polytetrafluoroethylene membrane having a construction shown in FIG. 5. The manufactured layer-built cell was connected to the fuel tank in the same way as that of comparative example 1 as shown in FIG. 17, and two sets of layer-built cells were connected to each other in series, by which a power source was formed.

The obtained power source had dimensions of approximately 110 mm high×110 mm long×21 mm wide and a power generation area for single cell of about 5 $cm^2$, and was provided with two fuel tanks 102 each having a capacity of about 34 $cm^3$. This power source exhibited a voltage of 7.4 V at a load current of 0.8 A at an operating temperature of 60° C., and the voltage in the case where power was generated while air is fed with a fan to the entire hole portion of the power source side wall formed of grooves on the air electrode side of separator was 13.1 V. The reason for this is probably that the supply of oxygen due to sufficient air diffusion is insufficient in the groove construction on the air electrode side of separator at the time when the power source is loaded.

The volumetric output density of this power source was about 23 W/l when no fan was used, and was about 41 W/l when a fan was used. When the two fuel tanks were filled with a total of 150 $cm^3$ of 10 wt % aqueous solution of methanol, and the power source was operated at a load current of 0.8 A at an operating temperature of 60° C. with the use of a fan, the voltage decreased suddenly after the output voltage of 13 V continued for about 30 minutes. Therefore, the volumetric energy density provided by one charge of 10 wt % aqueous solution of methanol was 20 Wh/l when a fan was used.

Figures 18A, 18B:
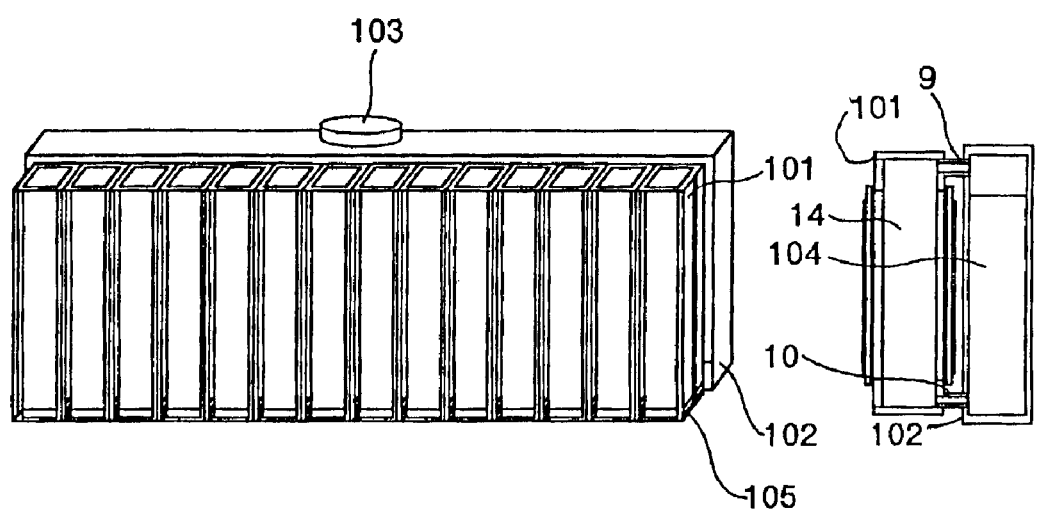
FIG. 18A is an outside construction view of a power source formed of square tubular fuel cell units.
FIG. 18B is a sectional view showing a state in which a fuel tank is connected to the fuel cell unit in accordance with the present invention.

The following will be a description of a fifth embodiment of the present invention. A construction of a power source in which fourteen fuel cell units each filled with the liquid holding material 14 are combined in series, the fuel cell unit being manufactured by the method shown in the first embodiment as a power source system formed of square tubular methanol fuel cell units in accordance with one embodiment of the present invention, is shown in FIG. 18A, and a sectional configuration for illustrating the connection of the fuel cell unit with the fuel tank is shown in FIG. 18B.

Figure 19:
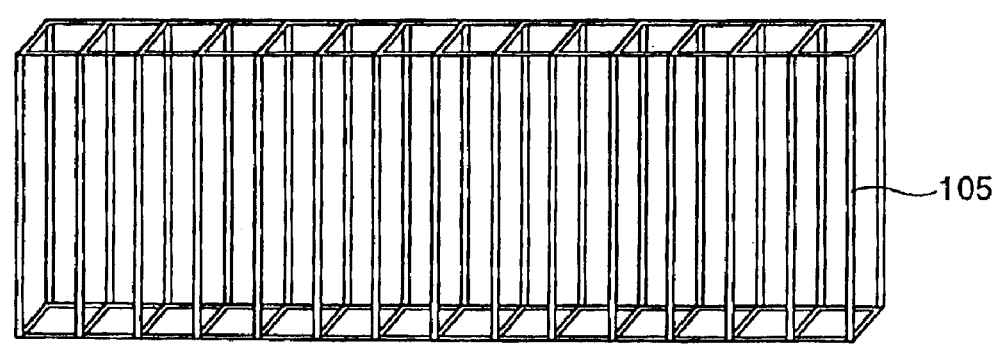
FIG. 19 is a construction view of a cell holder for storing square tubular fuel cell units in accordance with the present invention.

The fourteen fuel cell units are stored in series in the well-ventilated polyethylene-made cell holder 105 having a construction shown in FIG. 19. The fuel tank 102 is made of polypropylene, has outside dimensions of 50 mm high×72 mm long×15 mm wide, and has side walls with a thickness of 0.3 mm.

As shown in FIG. 12B, the fuel supply port 10 and the discharge port 9 of the fuel cell unit 101 are connected to the upper and lower parts of the side wall with the fuel tank 102 being a platform in an airtight manner. In the center on the top face of the tank, there is provided the screwed lid type fuel resupply port 103 provided with a function for selectively permeating gas by mounting a porous polytetrafluoroethylene membrane having a construction shown in FIG. 5, and the fuel tank is filled with 10 wt % of aqueous solution of methanol used as the fuel 104.

The cathode terminal of the fuel cell unit mounted in the cell holder 105 is connected to the adjacent anode terminal, and both ends of fourteen fuel cell units connected in series are used as power source terminals. The obtained power source has dimensions of approximately 50 mm high×72 mm long×20 mm wide and is provided with the fuel tank having a capacity of about 50 $cm^3$. This power source exhibited a voltage of 4.2 V at a load current of 0.8 A at an operating temperature of 65° C. The volumetric output density of this power source was about 47 W/l. When the fuel tank was filled with 50 $cm^3$ of 10 wt % aqueous solution of methanol, and the power source was operated at a load current of 0.8 A at an operating temperature of 60° C., power generation was able to be continued steadily for about 60 minutes at an output voltage of 4.2 V. Therefore, the volumetric energy density provided by one charge of 10 wt % aqueous solution of methanol was 47 Wh/l.

According to this embodiment, since the fourteen fuel cell units could be mounted in a compact manner, the capacity of fuel tank was able to be increased as compared with comparative example 1 providing almost the same volumetric output density in the cell construction using the conventional separator, and the volumetric energy density was about 2.5 times. Since the fuel cell units were mounted at intervals such that air, which served as an oxidizer, could be diffused sufficiently, power was able to be generated without the use of a fan for assisting the air supply unlike the power source of comparative example 1.

The following will be a description of a sixth embodiment of the present invention. A construction of a power source in which fourteen fuel cell units combined in series are arranged in two rows in parallel, the fuel cell unit being manufactured by the method shown in the second embodiment as a power source system formed of cylindrical methanol fuel cell units in accordance with another embodiment of the present invention, is shown in FIG. 20A, and a sectional configuration for illustrating the connection of the fuel cell unit with the fuel tank is shown in FIG. 20B.

Figure 20:
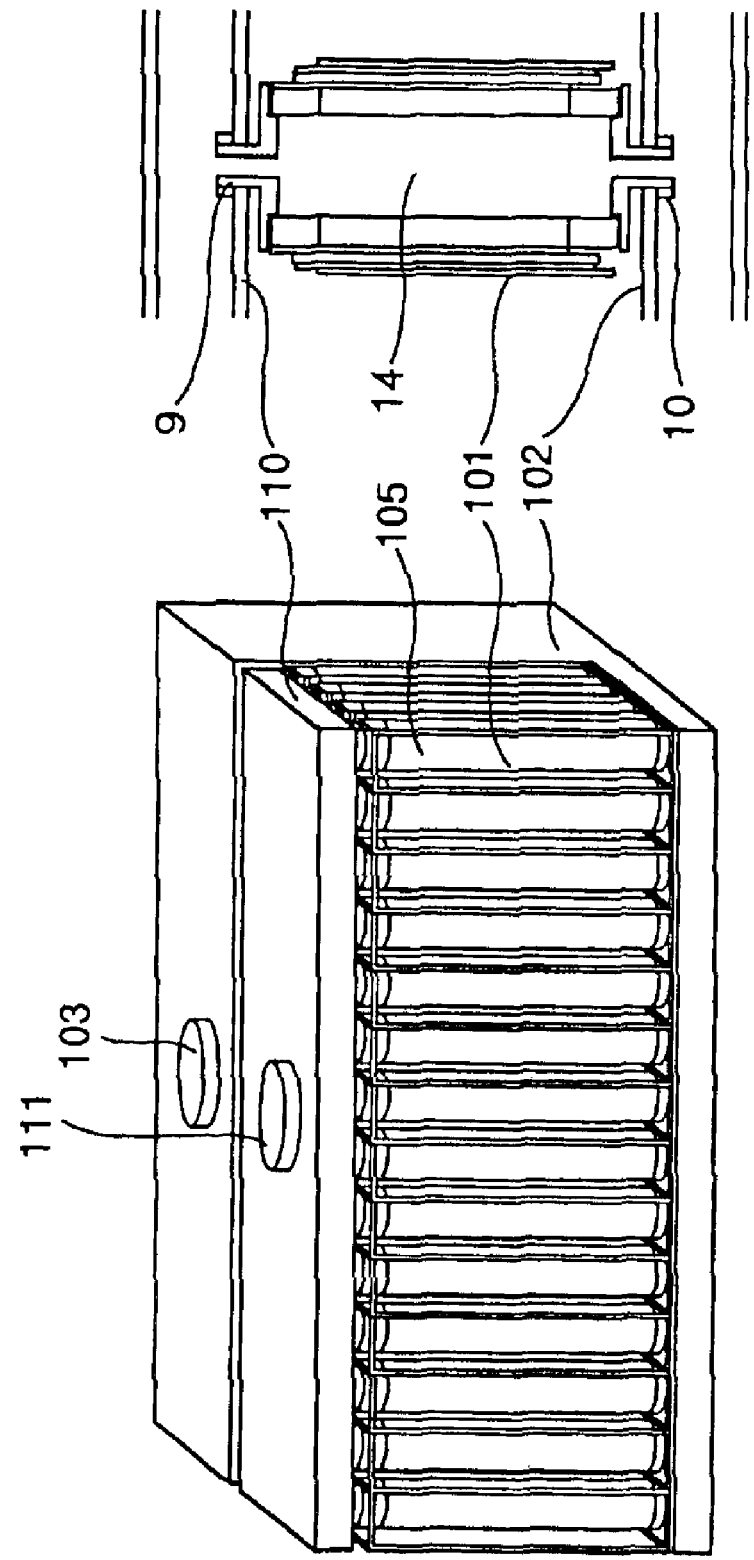
FIG. 20A is an outside construction view of a power source formed of cylindrical fuel cell units.
FIG. 20B is a sectional view showing a state in which a fuel tank is connected to the fuel cell unit in accordance with the present invention.
Figure 21:
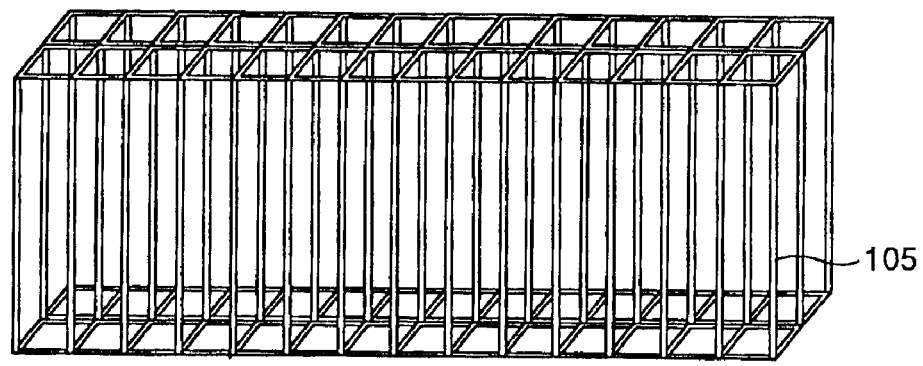
FIG. 21 is a construction view of a cell holder for storing cylindrical fuel cell units in accordance with the present invention.

The fuel cell units are stored in the cell holder 105 having a construction shown in FIG. 21 so that fourteen units combined in series are arranged in two rows in parallel. The fuel tank 102 is made of polypropylene, has outside dimensions of 70 mm high×76 mm long×22 mm wide, and has a construction having a platform construction with side walls 0.3 mm thick. As shown in FIG. 20B, the platform of the fuel tank 102 is filled with the liquid holding material 14. On the top face of the tank, there is provided the screwed lid type fuel resupply port 103 provided with a function for selectively permeating gas by mounting a porous polytetrafluoroethylene membrane having a construction shown in FIG. 5, and the fuel tank is filled with aqueous solution of methanol used as the fuel.

As shown in FIG. 20B, the fuel supply port 10 of each of the fuel cell units 101 is connected to the fuel tank 102, which serves as a platform, in an airtight manner, and above the fuel cell unit group, an exhaust tank 110 is mounted so as to be connected to the discharge port 9 of each of the fuel cell units in an airtight manner. The exhaust tank 110 is made of polypropylene, has outside dimensions of 10 mm high×76 mm long×8 mm wide, and has side walls with a thickness of 0.3 mm. On the top face of the exhaust tank 110, there is provided a screwed lid type exhaust port 111, which is a port for selectively permeating gas, in which a porous polytetrafluoroethylene membrane having a construction shown in FIG. 5 is mounted.

The cathode terminal of each of the fuel cell units mounted in the cell holder 105 is connected to the adjacent anode terminal, by which the fuel cell units are connected electrically so that fourteen units combined in series are arranged in two rows in parallel. The obtained power source has dimensions of approximately 70 mm high×76 mm long×22 mm wide and is provided with the fuel tank having a capacity of about 55 cm$^3$. This power source exhibited a voltage of 3.6 V at a load current of 1.5 A at an operating temperature of 60° C. The volumetric output density of this power source was about 50 W/l.

When the fuel tank was filled with 55 cm$^3$ of 10 wt % aqueous solution of methanol, and the power source was operated at a load current of 1.5 A at an operating temperature of 60° C., power generation was able to be continued for about 20 minutes at an output voltage of 3.5 V.

According to this embodiment, since the twenty-eight fuel cell units could be mounted in a compact manner, the power generation area was able to be increased as compared with the cell construction of comparative example 1 using the conventional separator, and a large load current was able to be obtained. Since the fuel cell units were mounted at intervals such that air, which served as an oxidizer, could be diffused sufficiently, power was able to be generated without the use of a fan for assisting the air supply unlike the power source of comparative examples 1 and 2.

Figures 22A, 22B:
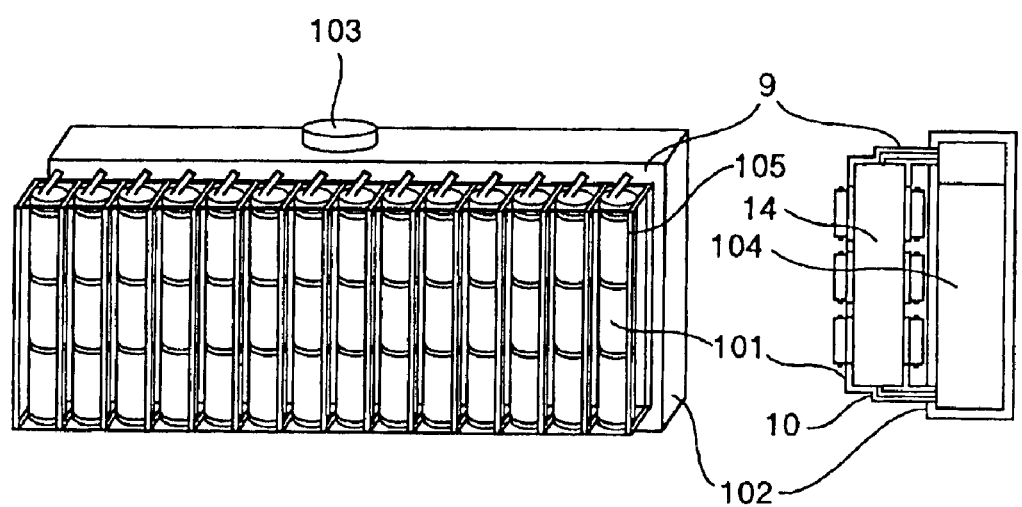
FIG. 22A is an outside construction view of a power source formed of high-voltage cylindrical fuel cell units.
FIG. 22B is a sectional view showing a state in which a fuel tank is connected to the fuel cell unit in accordance with the present invention.

The following will be a description of a seventh embodiment of the present invention. An outside construction of a power source in which fourteen fuel cell units are combined in series, the fuel cell unit being manufactured by the method shown in the third embodiment as a power source system formed of high-voltage cylindrical methanol fuel cell units in accordance with still another embodiment of the present invention, is shown in FIG. 22A, and a sectional configuration of the connection of the fuel cell unit with the fuel tank, which serves as a platform, is shown in FIG. 22B.

Fourteen fuel cell units are mounted in the well-ventilated polyethylene-made cell holder 105 having the same construction as described in the fifth embodiment, and are electrically connected in series. The fuel tank 102, which serves as a platform, has outside dimensions of 100 mm high×120 mm long×13 mm wide, and is constructed by side walls with a thickness of 0.3 mm. On the top face of the fuel tank 102, there is provided the screwed lid type fuel resupply port 103 provided with a function for selectively permeating gas by mounting a porous polytetrafluoroethylene membrane having a construction shown in FIG. 5, and the fuel tank is filled with aqueous solution of methanol used as the fuel. The side wall of the fuel tank 102 is mounted in an airtight manner via the fuel supply port 10 and the discharge port 9 of the fuel cell unit as shown in FIG. 22B. The obtained power source has dimensions of approximately 100 mm high×120 mm long×21 mm wide and is provided with the fuel tank having a capacity of about 145 cm$^3$. This power source exhibited a voltage of 13.3 V at a load current of 0.8 A at an operating temperature of 65° C. The volumetric output density of this power source was about 42 W/l. When the fuel tank was filled with 145 cm$^3$ of 10 wt % aqueous solution of methanol, and the power source was operated at a load current of 0.8 A at an operating temperature of 60° C., power generation was able to be continued steadily for about 65 minutes at an output voltage of 13.2 V. Therefore, the volumetric energy density provided by one charge of 10 wt % aqueous solution of methanol was 45 Wh/l.

According to this embodiment, since the fourteen fuel cell units could be mounted in a compact manner, the capacity of fuel tank was able to be increased as compared with comparative example 2 in which the power source of almost the same size was manufactured in the cell construction using the conventional separator, and the volumetric energy density was about two times. Since the fuel cell units were mounted at intervals such that air, which served as an oxidizer, could be diffused sufficiently, power was able to be generated without the use of a fan for assisting the air supply unlike the power source of comparative example 2.

Figures 23A, 23B:
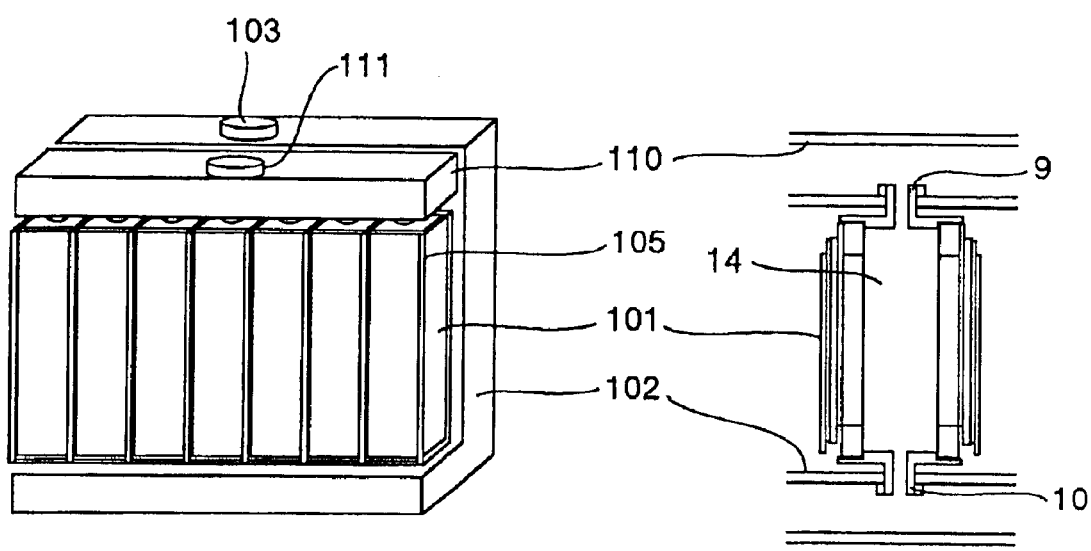
FIG. 23A is an outside construction view of a power source formed of high-voltage square tubular fuel cell units.
FIG. 23B is a sectional view showing a state in which a fuel tank is connected to the fuel cell unit in accordance with the present invention.

The following will be a description of an eighth embodiment of the present invention. An outside construction of a power source in which seven fuel cell units are combined in series, the fuel cell unit being manufactured by the method shown in the fourth embodiment as a power source system formed of high-voltage square tubular fuel cell units in which aqueous solution of methanol is used as a fuel, is shown in FIG. 23A, and a sectional configuration of the connection of the fuel cell unit with the fuel tank, which serves as a platform, is shown in FIG. 23B.

Seven fuel cell units 101 are mounted in the well-ventilated polyethylene-made cell holder 105 having the same construction as described in the fifth embodiment, and are electrically connected in series. The fuel tank 102 is made of polypropylene, has outside dimensions of 130 mm high×80 mm long×22 mm wide, and is constructed so as to have a platform for mounting the cells. The platform of the fuel tank 102 is filled with the liquid holding material 14 as shown in FIG. 23B. On the top face of the fuel tank, there is provided the screwed lid type fuel resupply port 103 provided with a function for selectively permeating gas by mounting a porous polytetrafluoroethylene membrane having a construction shown in FIG. 5, and the fuel tank is filled with aqueous solution of methanol used as the fuel. Each of the fuel cell units 101 and the platform of the fuel tank 102 are connected to each other in an airtight manner via the fuel supply port 10 of the fuel cell unit 101 in the same way as that of the sixth embodiment. Above the fuel cell unit group, the exhaust tank 110 is mounted via the discharge port 9 of each of the fuel cell units 101 in an airtight manner. The exhaust tank 110 is made of polypropylene, has outside dimensions of 10 mm high×80 mm long×10 mm wide, and has side walls with a thickness of 0.3 mm.

On the top face of the exhaust tank 110, there is provided the screwed lid type exhaust port 111, which is a port for selectively permeating gas, in which a porous polytetrafluoroethylene membrane having a construction shown in FIG. 5 is mounted. The obtained power source has dimensions of approximately 130 mm high×80 mm long×22 mm wide and is provided with the fuel tank having a capacity of about 110 cm$^3$. This power source exhibited a voltage of 8.5 V at a load current of 0.8 A at an operating temperature of 60° C. The volumetric output density of this power source was about 30 W/l. When the fuel tank was filled with 110 cm$^3$ of 10 wt % aqueous solution of methanol, and the power source was operated at a load current of 0.8 A at an operating temperature of 60° C., power generation was able to be continued steadily for about 75 minutes at an output voltage of 8.5 V.

Therefore, the volumetric energy density provided by one charge of 10 wt % aqueous solution of methanol was 37 Wh/l. According to this embodiment, since the seven fuel cell units in which four single cells were connected in series could be mounted in a compact manner, the capacity of fuel tank was able to be increased as compared with the case in which the power source was manufactured in the cell construction using the conventional separator, and the volumetric energy density was about two times. Since the fuel cell units were mounted at intervals such that air, which served as an oxidizer, could be diffused sufficiently, power was able to be generated without the use of a fan for assisting the air supply unlike the power source of comparative examples 1 and 2.

The following will be a description of a ninth embodiment of the present invention. An outside construction of a power source formed of a cylindrical fuel cell unit, which uses aqueous solution of methanol as a fuel, is shown in FIG. 24A, and a sectional configuration thereof is shown in FIG. 24B.

A cylinder which is made of stainless steel SUS316, measures 5.6 mm in outside diameter, 5.3 mm in inside diameter, and 47 mm in length, has a closed bottom, and is provided with a 5 mm long screw type connector element 24 above the cylinder is used as the hollow cylindrical support 1. The porous section 8 was provided over a 36 mm width on the outside wall of the cylinder by forming through holes with a diameter of about 0.5 mm so that the porosity was about 70%. On the other hand, a Nafion 117 membrane of 17.5 mm×42 mm was used as the electrolyte membrane 2. A platinum-ruthenium catalyst with carbon carrier was applied onto one electrolyte membrane surface by the same method as that of the second embodiment so that its size was 16 mm×36 mm and its thickness was 20 μm to form the anode electrode 3, and a substance produced by adding polytetrafluoroethylene powders with 60% of catalyst weight to a platinum catalyst with carbon carrier as a water repellant and by mixing them was applied onto the surface opposite to the surface onto which anode was applied so that its size was 16 mm×36 mm and its thickness was 15 μm to form the cathode electrode 4, by which a membrane electrode assembly was manufactured. The silicone liquid gasket 16 was applied to a potion with a width of 3 mm of electrolyte membrane exposed to both ends of a long side of the obtained membrane electrode assembly. While the liquid gasket 16 was wound so that the cathode face lapped on the porous section 8 of the hollow support 1 and was tightened from the outer periphery, Nafion alcohol solution concentrated to 30 wt % in advance was applied to a joint portion in which the electrolyte membrane 2 exposed at both ends of the short side was in contact in the lengthwise direction of the cylindrical support, and the alcohol solution was dried to effect bonding.

The exposed face of the electrolyte membrane 2 corresponding to the portion in which the gasket 16 was applied at the upper and lower ends of the membrane electrode assembly mounted on the hollow cylindrical support was fixed with the rubber-based tightening band 17, and on the outer peripheral surface of the cathode 4, the porous cathode collector 7 in which a copper-made mesh was coated with a conductive carbon paint with polyvinylidene fluoride being used as a binder was tightened and fixed. The fixed cathode collector 17 was used as a cathode terminal, and the metallic hollow cylindrical support was used as an anode terminal. The obtained fuel cell unit had a power generation area of about 5.7 cm$^2$ and a hollow cylinder volume of about 0.8 cm$^3$. The hollow cylinder was filled with 10 wt % of aqueous solution of methanol, and the performance of the fuel cell unit was evaluated at a temperature of about 60° C. As a result, the output voltage was 0.36 V at a load current of 0.8 A.

Since the fuel cell unit in accordance with this embodiment is formed of a single cell, the hollow support can be formed of a corrosion resistant metallic material. Therefore, the hollow support has a function of the anode collector and the anode terminal, so that the construction of fuel cell unit can be made simple.

The configuration of a power source will be described with reference to FIG. 25A showing an outside construction of a power source in which forty-two cylindrical fuel cell units manufactured in this embodiment are arranged in series and FIG. 25B showing a sectional construction of the connection of the fuel cell unit with a fuel tank serving as a platform. The fuel tank 102 was made of vinyl chloride, had outside dimensions of 65 mm high×43 mm wide×50 mm long, and had a construction in which the bottom plate had a thickness of 5 mm and the other walls had a thickness of 1 mm. On the top face of the fuel tank, there were provided two screwed lid type fuel resupply ports 103 provided with a function for selectively permeating gas by mounting a porous polytetrafluoroethylene membrane having a construction shown in FIG. 5, and the fuel tank was filled with aqueous solution of methanol used as the fuel 104. A screw type mount port was provided at the bottom of the fuel tank 102, and was connected to the connector element 24 of the fuel cell unit 101 in an airtight manner.

The power source was constructed so that a group of the fuel cell units 101 mounted on the fuel tank 102 and a base plate 112 having outside dimensions of 43 mm wide×50 mm long×3 mm thick were fixed by a support member 113. The obtained power source approximately measured 111 mm high×43 wide×50 mm long, had a maximum fuel filling capacity of about 150 cm$^3$ and a power generation area of 5.7 cm$^2$, and was constructed by forty-two fuel cell units arranged in series. When this power source was filled with 150 cm$^3$ of 10 wt % aqueous solution of methanol as a fuel, and was operated at a load current of 1 A at a temperature of about 60° C., power generation was continued for about 50 minutes at an output voltage of 13 V. Therefore, the volumetric output density of this power source was 54 W/l, and the volumetric energy density provided by one charge of 10 wt % aqueous solution of methanol was 45 Wh/l.

Since this power source has the fuel tank at the upper part thereof, fuel is always filled into the fuel cell units. Therefore, this power source has a characteristic of no need for the liquid holding material for fuel, which has been described in the fifth and sixth embodiments, to be filled. In this embodiment as well, the volumetric energy density could be two times or more as compared with the cell of comparative example 2. Since the fuel cell units were mounted at intervals such that air, which served as an oxidizer, could be diffused sufficiently, power was able to be generated without the use of a fan for assisting the air supply unlike the power source of comparative example 2.

Figure 27:
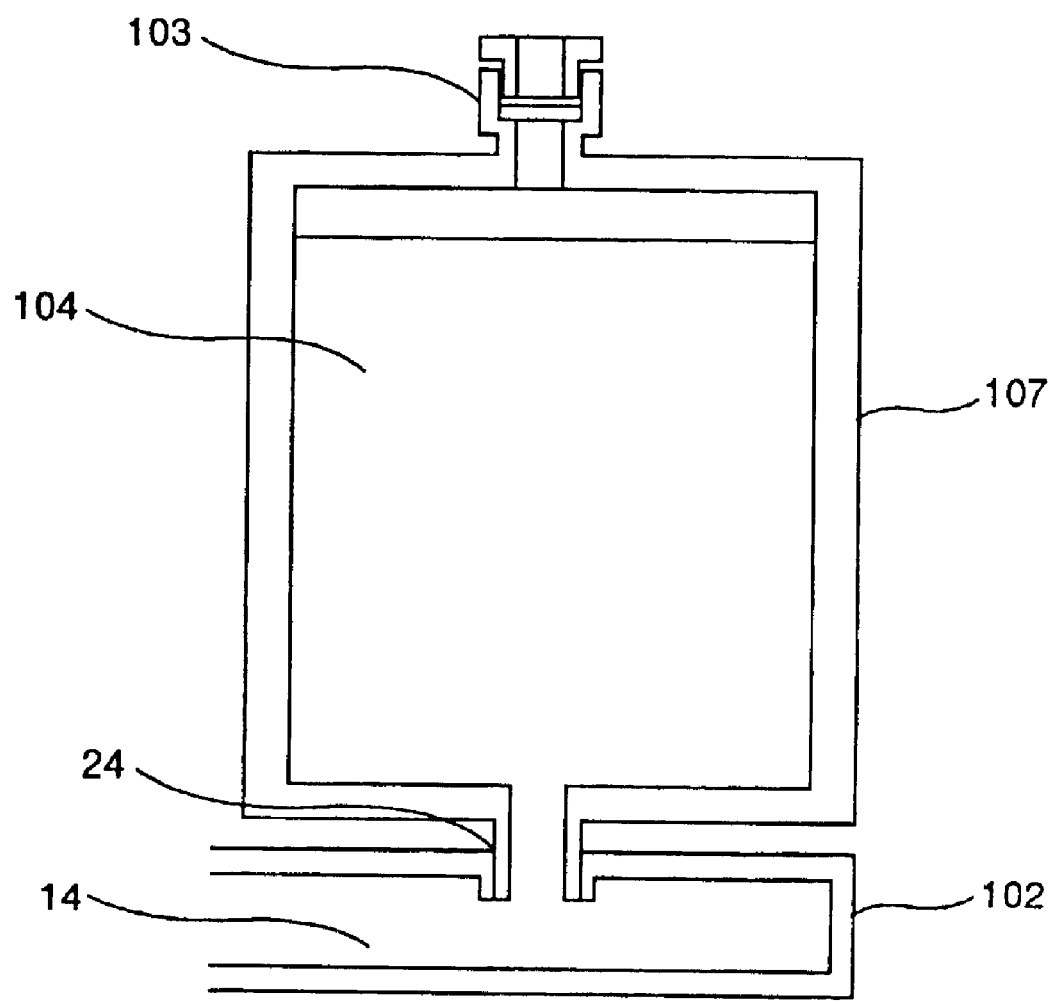
FIG. 27 is a sectional view showing a state in which an auxiliary fuel tank is connected to a fuel tank for a power source formed of cylindrical fuel cell units in accordance with the present invention.

The following will be a description of a tenth embodiment of the present invention. A power source system formed of cylindrical fuel cell units, which use aqueous solution of methanol as a fuel, is shown in FIG. 26A, and a sectional configuration thereof is shown in FIG. 26B. FIG. 27 is a sectional view showing a state in which an auxiliary fuel tank is connected to a fuel tank.

The fuel cell units 101 are stored in the cell holder 105 having a construction as shown in FIG. 21 so that fourteen cell units combined in series are arranged in two rows. The fuel tank 102 is formed of a platform which is made of polypropylene and has outside dimensions of 20 mm high× 76 mm long×30 mm wide and side walls having a thickness of 1 mm. The platform of the fuel tank 102 is filled with the liquid holding material 14 as shown in FIG. 26B, and the platform of an auxiliary fuel tank 107 is provided with a connector portion 24 having a detachable construction as shown in FIG. 27. The auxiliary fuel tank 107 is made of polypropylene and has outside dimensions of 49 mm high× 76 mm long×22 mm wide and side walls having a thickness of 1 mm. On the top face of the auxiliary fuel tank, there is provided the screwed lid type fuel resupply port 103 provided with a function for selectively permeating gas by mounting a porous polytetrafluoroethylene membrane having a construction shown in FIG. 5, and the auxiliary fuel tank is filled with aqueous solution of methanol used as the fuel.

As shown in FIG. 26B, the fuel supply port 10 of each of the fuel cell units 101 is connected to the fuel tank 102 serving as a platform in an airtight manner. Above the fuel cell unit group, the exhaust tank 110 is mounted so as to be connected to the discharge port 9 of each of the fuel cell units in an airtight manner. The exhaust tank 110 is made of polypropylene, has outside dimensions of 10 mm high×76 mm long×8 mm wide, and has side walls with a thickness of 0.3 mm. On the top face of the exhaust tank 110, there is provided the screwed lid type exhaust port 111, which is a port for selectively permeating gas, in which a porous polytetrafluoroethylene membrane having a construction shown in FIG. 5 is mounted. The cathode terminal of each fuel cell unit stored in the cell holder 105 is connected to the adjacent anode terminal, by which twenty-eight fuel cell units are connected electrically. The obtained power source had dimensions of approximately 70 mm high×76 mm long×30 mm wide and was provided with the fuel tank having a capacity of about 31 $cm^3$, and the auxiliary fuel tank had a capacity of about 69 $cm^3$. When a power generation test was conducted at an operating temperature of 60° C., the power source exhibited a voltage of 8.4 V at a load current of 0.8 A. When the auxiliary fuel tank 107 was filled with 65 $cm^3$ of 10 wt % aqueous solution of methanol, and the power source was operated at a load current of 1.5 A at an operating temperature of 60° C., power generation was able to be continued for about 80 minutes at an output voltage of 3.6 V. Thereafter, when the auxiliary fuel tank filled with 65 $cm^3$ of 10 wt % aqueous solution of methanol was newly replaced, and the power source was operated at a load current of 1.5 A at an operating temperature of 60° C., power generation was able to be continued for about 80 minutes at an output voltage of 3.6 V. The direct methanol fuel cell uses aqueous solution of methanol as the fuel, and the aqueous solution of methanol is consumed by permeating the electrolyte membrane in addition to being consumed as fuel by power generation.

Because the ratios of the electrolyte membrane permeating amounts of methanol and water differ depending on the operation state, the concentration of methanol must be regulated so as to be in a predetermined range when fuel is newly resupplied to the tank.

However, if the capacity of fuel tank connected to the power source is made relatively low and the power source is operated in the state in which the auxiliary fuel tank is connected as in this embodiment, merely by replacing the auxiliary fuel tank filled with fuel of a fixed concentration as the fuel is consumed, the long-term use is enable without the regulation of methanol concentration.

According to the present invention, in the case where the required current is relatively small and a high voltage is needed, the fuel cell unit can be provided with a plurality of generator sections in which an anode, electrolyte membrane, and cathode are disposed on the outer peripheral surface of a hollow support, and the generator sections can be connected to each other in series with a conductive interconnector. Therefore, a high voltage can be achieved, and further a small-size fuel cell generator can be realized.

Fuel is supplied without any use of a forced supply mechanism provided in the hollow support by connecting a fuel tank as a platform. At this time, the hollow support is filled with a material for holding liquid fuel and sucking it up by the capillary force, by which fuel is replenished, and the fuel cell unit having the generator section on the outer peripheral surface of the hollow support is supplied with an oxidizer by the diffusion of oxygen in air, so that a simple system without the need for auxiliary equipment for supplying fuel and oxidizer can be configured.

Also, by using aqueous solution of methanol with a high volumetric energy density as a liquid fuel, power generation can be continued for a long period of time as compared with the case where hydrogen gas in the tank having the same capacity is used as a fuel. By successively replenishing fuel, a continuous generator without the need for charging time unlike the secondary battery can be realized.

By using the power source in accordance with the present invention as a battery charger attached to a cellular phone, portable personal computer, portable audio and visual equipment, and other portable information terminals, which are mounted with a secondary battery, or by using the power source as a directly incorporated power source without the secondary battery being mounted, the electronic equipment can be used for a long period of time, and continuous use of the electronic equipment can be achieved by the replenishment of fuel.

What is claimed is:

1. A fuel cell, comprising:
    an anode for oxidizing liquid fuel;
    a cathode for reducing oxygen; and
    an electrolyte membrane for Insulating said anode from said cathode,
    wherein said fuel cell has a construction of a hollow support, and said anode, electrolyte membrane, and cathode are disposed on the outer peripheral surface of said hollow support to form a generator section, and said fuel is brought into contact with the inside of said hollow support, and gas containing said oxygen is brought into contact with the outside of said generator section, and a holding material for holding the liquid fuel is filled into said hollow support.

2. The fuel cell according to claim 1, wherein said liquid fuel is an aqueous solution of methanol.

3. The fuel cell generator according to claim 1, wherein a diffusion layer is disposed around said cathode.

4. The fuel cell according to claim 1, wherein said hollow support is electrically conductive.

5. The fuel cell according to claim 1, wherein said material for holding said liquid fuel is substantially completely filled into said hollow support.

6. The fuel cell according to claim 1, wherein a plurality of generator sections comprising said anode, electrolyte membrane, and cathode are disposed on the outer peripheral surface of said hollow support, and said generator sections are electrically connected to each other.

7. The fuel cell according to claim 1, wherein material for holding said liquid fuel has an affinity for absorbing said liquid fuel.

8. The fuel cell according to claim 1, wherein material for holding said liquid fuel is at least one of a glass, alumina, silica alumina, silica, non-graphite carbon, cellulose and water absorbing polymeric fiber.

9. Portable electronic equipment, wherein a fuel cell has an anode for oxidizing liquid methanol, a cathode for reducing oxygen, and an electrolyte membrane for insulating said anode from said cathode; said fuel cell has a construction of a hollow support filled with a material for holding liquid methanol, and has a plurality of generator sections consisting of an anode, electrolyte membrane, cathode, and diffusion layer on the outer peripheral surface of said hollow support, said generator sections being connected electrically to each other to form a fuel cell unit; a plurality of said fuel cell units are connected to a vessel for storing liquid fuel, said fuel cell units being connected electrically to each other to form a fuel cell generator; and said portable electronic equipment has at least a secondary battery that is charged by a charger configured so as to include said fuel cell generator.

10. A portable power source, wherein said portable power source is configured so as to include a fuel cell generator in which a fuel cell has an anode for oxidizing methanol, a cathode for reducing oxygen, and an electrolyte membrane for insulating said anode from said cathode; said fuel cell has a construction of a hollow support filled with a material for holding liquid methanol, and has a plurality of generator sections consisting of an anode, electrolyte membrane, cathode, and diffusion layer on the outer peripheral surface of said hollow support, said generator sections being connected electrically to each other to form a fuel cell unit; and a plurality of said fuel cell units are connected to a vessel for storing liquid fuel, said fuel cell units being connected electrically to each other.

11. A fuel cell generator, wherein said fuel cell generator has a plurality of fuel cell units in which a fuel cell has a construction of a hollow support filled with a material for holding liquid fuel, and an anode for oxidizing liquid fuel, a cathode for reducing oxygen, and an electrolyte membrane for insulating said anode from said cathode are formed on the outer peripheral surface of said hollow support in the order of said anode, electrolyte membrane, and cathode, and a diffusion layer is disposed around said cathode, whereby at least one generator section is formed, said generator sections being connected electrically to each other; and said fuel cell units are connected to a fuel vessel for storing said fuel so that said fuel is supplied from said fuel vessel to each of said fuel cell units, said fuel cell units being connected electrically to each other.

12. The fuel cell generator according to claim 11, wherein said liquid fuel is an aqueous solution of methanol.

13. A fuel cell generator, wherein a fuel cell, having an anode for oxidizing liquid fuel, a cathode for reducing oxygen, and an electrolyte membrane for insulating said anode from said cathode, has a construction of a hollow support filled with a material for holding the liquid fuel; said fuel cell generator includes a fuel cell unit in which a plurality of fuel cells each having a generator section formed by said anode, electrolyte membrane, and cathode disposed on the outer peripheral surface of said hollow support are connected and a vessel for storing said liquid fuel, said generator sections being connected electrically to each other; and power is generated by supplying said liquid fluid from said vessel into said hollow support.

14. The fuel cell according to claim 13, wherein said vessel for storing said liquid fuel has an exhaust hole for venting gas while substantially preventing leakage of said liquid fuel.

15. The fuel cell generator according to claim 13, wherein said liquid fuel is an aqueous solution of methanol.

16. The fuel cell generator according to claim 13, wherein said material for holding said liquid fuel is substantially completely filled into said hollow support.

17. The fuel cell generator according to claim 13, wherein material for holding said liquid fuel has an affinity for absorbing said liquid fuel.

18. The fuel cell generator according to claim 13, wherein material for holding said liquid fuel is at least one of a glass, alumina, silica alumina, silica, non-graphite carbon, cellulose and water absorbing polymeric fiber.

19. Portable electronic equipment, wherein said portable electronic equipment is driven by a fuel cell generator in which a fuel cell has an anode for oxidizing liquid methanol, a cathode for reducing oxygen, and an electrolyte membrane for insulating said anode from said cathode; said fuel cell has a construction of a hollow support filled with a material for holding methanol, and has a plurality of generator sections consisting of an anode, electrolyte membrane, cathode, and diffusion layer on the outer peripheral surface of said hollow support, said generator sections being connected electrically to each other to form a fuel cell unit; and a plurality of said fuel cell units are connected to a vessel for storing liquid fuel, said fuel cell units being connected electrically to each other.

20. The portable electronic equipment according to claim 19, wherein said material for holding said liquid methanol is substantially completely filled into said hollow support.

21. The portable electronic equipment according to claim 19, wherein material for holding said liquid methanol has an affinity for absorbing said liquid methanol.

22. The portable electronic equipment according to claim 19, wherein material for holding said liquid methanol is at least one of a glass, alumina, silica alumina, silica, non-graphite carbon, cellulose and water absorbing polymeric fiber.

* * * * *